(12) United States Patent
Harmon, Sr. et al.

(10) Patent No.: US 8,109,097 B2
(45) Date of Patent: *Feb. 7, 2012

(54) HIGH EFFICIENCY DUAL CYCLE INTERNAL COMBUSTION ENGINE WITH STEAM POWER RECOVERED FROM WASTE HEAT

(75) Inventors: James V. Harmon, Sr., Mahtomedi, MN (US); James V. Harmon, Jr., St. Paul, MN (US); Stephen C. Harmon, Mahtomedi, MN (US)

(73) Assignee: Thermal Power Recovery, LLC, Mahtomedi, MN (US)

( * ) Notice: Subject to any disclaimer, the term of this patent is extended or adjusted under 35 U.S.C. 154(b) by 304 days.

This patent is subject to a terminal disclaimer.

(21) Appl. No.: 12/387,113

(22) Filed: Apr. 28, 2009

(65) Prior Publication Data

US 2009/0205338 A1    Aug. 20, 2009

Related U.S. Application Data

(63) Continuation-in-part of application No. 12/075,042, filed on Mar. 7, 2008, now Pat. No. 7,997,080.

(60) Provisional application No. 60/905,732, filed on Mar. 7, 2007, provisional application No. 61/192,254, filed on Sep. 17, 2008, provisional application No. 61/194,608, filed on Sep. 29, 2008.

(51) Int. Cl.
| | |
|---|---|
| *F01K 23/06* | (2006.01) |
| *F01K 13/00* | (2006.01) |
| *F01K 27/00* | (2006.01) |
| *F01K 23/10* | (2006.01) |
| *F02G 3/00* | (2006.01) |

(52) U.S. Cl. ............... 60/670; 60/643; 60/676; 60/618; 60/616; 60/614; 123/79 C

(58) Field of Classification Search .................... 60/614, 60/616–620, 712, 670–671, 659, 688, 691–693, 60/698, 676, 678, 642–643, 650; 123/50 R, 123/73 F, 73 FA, 79 C; 91/242, 245, 471; 92/62, 65
See application file for complete search history.

(56) References Cited

U.S. PATENT DOCUMENTS 753,647 A    3/1904  Thorson
(Continued)

FOREIGN PATENT DOCUMENTS

DE    3437151 A1    4/1986
(Continued)

OTHER PUBLICATIONS

J.R. Allen and J.A. Bursley, Heat Engines,1925 Third Edition, pp. 210 and 211, McGraw Hill, New York, U.S.

(Continued)

*Primary Examiner* — Thai Ba Trieu
(74) *Attorney, Agent, or Firm* — Nikolai & Mersereau, P.A.; James V. Harmon

(57) ABSTRACT

A high efficiency combined cycle internal combustion and steam engine includes a cylinder with a combustion chamber outward of a piston, a cylinder cap slideably mounted within the piston and a steam expansion chamber inside the piston. The cap can be heated to reduce condensation of steam. Steam remaining when a steam exhaust valve closes can be recompressed prior to admitting the next charge of steam. One valve or a pair of steam inlet valves connected in series act in cooperation to help maximize efficiency. The amount of steam admitted each stroke is regulated by shifting the phase of one steam admission valve of a pair to vary their overlap for determining the steam mass admitted each cycle. Other valves balance steam displacement with the steam generator output to use steam more efficiently.

46 Claims, 18 Drawing Sheets

U.S. PATENT DOCUMENTS

| | | | |
|---|---|---|---|
| 854,622 A | 2/1907 | DuShane | |
| 915,103 A * | 3/1909 | Meyer | 123/73 F |
| 1,027,380 A | 5/1912 | Fryer | |
| 1,128,125 A | 2/1915 | Fryer | |
| 1,169,672 A | 1/1916 | Palm | |
| 1,252,927 A | 1/1918 | Muir | |
| 1,311,529 A | 7/1919 | Muir | |
| 1,324,183 A | 12/1919 | Still | |
| 1,332,633 A | 3/1920 | Parrish | |
| 1,427,395 A | 8/1922 | Kaschtofsky | |
| 1,452,011 A * | 4/1923 | Watton | 123/73 F |
| 1,489,291 A | 4/1923 | Tuerk | |
| 1,496,839 A | 6/1924 | Bohan et al. | |
| 1,498,942 A * | 6/1924 | Wissmann | 123/79 C |
| 1,502,918 A | 7/1924 | Scott | |
| 1,517,372 A | 12/1924 | Martineau | |
| 1,542,578 A | 6/1925 | Pool | |
| 1,601,995 A | 10/1926 | Butler et al. | |
| 1,629,677 A | 5/1927 | Bull | |
| 1,630,841 A * | 5/1927 | Fusch | 123/50 R |
| 1,732,011 A | 10/1929 | Gouirand | |
| 1,758,482 A * | 5/1930 | Tune | 123/50 R |
| 1,802,828 A | 4/1931 | Perrenoud | |
| 1,913,251 A | 6/1933 | Smith | |
| 2,000,108 A | 5/1935 | Tucker | |
| 2,040,453 A | 5/1936 | Weber | |
| 2,057,075 A | 10/1936 | Wuehr | |
| 2,063,970 A * | 12/1936 | Young | 123/50 R |
| 2,138,351 A | 11/1938 | McGonigagll | |
| 2,196,980 A | 4/1940 | Campbell | |
| 2,402,699 A | 6/1946 | Williams | |
| 2,649,082 A | 8/1953 | Harbert et al. | |
| 2,943,608 A | 7/1960 | Williams | |
| 3,100,001 A * | 8/1963 | Forwald | 92/65 |
| 3,200,798 A | 8/1965 | Mansfield | |
| 3,248,870 A | 5/1966 | Morgenroth | |
| 3,650,295 A | 3/1972 | Smith | |
| 3,881,459 A * | 5/1975 | Gaetcke | 123/79 C |
| 3,908,686 A | 9/1975 | Carter et al. | |
| 3,921,404 A | 11/1975 | Mason | |
| 3,995,531 A | 12/1976 | Zibrun | |
| 4,023,537 A | 5/1977 | Carter, Sr. et al. | |
| 4,050,357 A | 9/1977 | Carter, Sr. et al. | |
| 4,077,214 A | 3/1978 | Burke et al. | |
| 4,201,058 A | 5/1980 | Vaughan | |
| 4,300,353 A | 11/1981 | Ridgway | |
| 4,352,342 A | 10/1982 | Cser et al. | |
| 4,362,132 A | 12/1982 | Neuman | |
| 4,377,934 A | 3/1983 | Marshall | |
| 4,425,763 A | 1/1984 | Porta et al. | |
| 4,509,464 A | 4/1985 | Hansen | |
| 4,522,163 A * | 6/1985 | Hooper | 123/73 F |
| 4,550,694 A | 11/1985 | Evans | |
| 4,590,766 A | 5/1986 | Striebich | |
| 4,622,925 A | 11/1986 | Kubozuka | |
| 4,706,462 A | 11/1987 | Soltermack | |
| 4,724,800 A | 2/1988 | Wood | |
| 4,732,115 A | 3/1988 | Lapeyre | |
| 4,747,271 A | 5/1988 | Fisher | |
| 4,785,631 A | 11/1988 | Striebich | |
| 4,864,826 A | 9/1989 | Lagow | |
| 4,928,658 A * | 5/1990 | Ferrenberg et al. | 60/517 |
| 5,000,003 A | 3/1991 | Wicks | |
| 5,031,579 A | 7/1991 | Evans | |
| 5,111,776 A | 5/1992 | Matsushiro et al. | |
| 5,121,607 A | 6/1992 | George, Jr. | |
| 5,255,636 A | 10/1993 | Evans | |
| 5,385,211 A | 1/1995 | Carroll | |
| 5,845,609 A | 12/1998 | Corrigan | |
| 5,934,076 A | 8/1999 | Coney | |
| 6,095,100 A | 8/2000 | Hughes | |
| 6,205,788 B1 | 3/2001 | Warren | |
| 6,457,309 B1 * | 10/2002 | Firey | 60/517 |
| 6,546,902 B1 * | 4/2003 | Davis | 123/79 C |
| 6,694,737 B2 | 2/2004 | Tsai et al. | |
| 6,834,503 B2 | 12/2004 | Freymann | |
| 6,895,756 B2 | 5/2005 | Schmotolocha | |
| 6,971,344 B2 * | 12/2005 | HIrano | 123/79 C |
| 6,986,252 B2 | 1/2006 | Hedman | |
| 7,056,251 B2 | 6/2006 | Ibaraki | |
| 7,104,063 B2 | 9/2006 | Clemens | |
| 7,421,983 B1 | 9/2008 | Taylor | |
| 2007/0246007 A1 * | 10/2007 | Robinson | 123/316 |

FOREIGN PATENT DOCUMENTS

| | | |
|---|---|---|
| DE | 4030698 A1 * | 4/1992 |
| GB | 1750 | 0/1913 |
| GB | 25356 | 0/1911 |
| GB | 28472 | 0/1914 |
| GB | 125395 | 4/1919 |
| GB | 130621 | 8/1919 |
| JP | 55093915 A * | 7/1980 |
| JP | 2008121615 | 5/2008 |
| JP | 2008240614 | 10/2008 |
| JP | 200997391 | 5/2009 |
| JP | 2009097391 A * | 5/2009 |
| WO | WO 0231319 | 4/2002 |
| WO | WO 03050402 | 6/2003 |

OTHER PUBLICATIONS

Jerry Peoples, Gewgaws of Production Steam, The Steam Automobile Bulletin, Sep.-Oct. 2006, vol. 20, No. 5, pp. 7-13.

J.V. Haywood, Internal Combustion Engines, McGraw-Hill Book Co. 1988 pp. 657-659.

D.A. Low, Heat Engines, Longmans, Green & Co. 1949, pp. 246-248.

Marks, et. al., Marks' Standard Handbook for Mechanical Engineers, McGraw-Hill, Inc. 9th ed. 1987, pp. 9-36 to 9-38.

An Assessment of the Technology of Rankine Engines for Automobiles. Div. of Transportation Energy Conservation, U.S. Energy Research & Develop. Admin., Apr. 1977, pp. 21-24.

Bill Cartland, Easy Starting Bash Valve, Steam Automobile Club of America, Inc. Technical Report No. 120, 1993, one page.

Ronald Loving, Low NOx Thermal Oxidizers, Steam Automobile Bulletin, vol. 20 No. 5, Sep.-Oct. 2006, pp. 28-30.

Tom Kimmel, The Leslie Engine, Steam Automobile Bulletin, vol. 21 No. 5, Sep.-Oct. 2007, pp. 14-16.

D.A. Arias, et. al., Theoretical Analysis of Waste Heat Recovery From and Internal Combustion Engine in a Hybrid Vehicle, SAE Technical Paper, 2006-01-1605, Apr. 3-6, 2006.

S.S. Miner, Developments in Automotive Steam Power Plants, SAE Technical Paper, No. 690043, Jan. 13-17, 1969.

BMW's Hybrid Vision: Gasoline and Steam, Popular Science Magazine, Mar. 2006, p. 22 (one page).

Note: All of the above-listed foreign & non-patent publications were previously provided in an IDS in U.S. Appl. No. 12/075,042, filed Mar. 7, 2008.

An Assessment of the Technology of Rankine Engines for Automobiles. Div. of Transportation Energy Conservation, U.S. Energy Research & Develop. Admin., Apr. 1977, pp. 43-54.

* cited by examiner

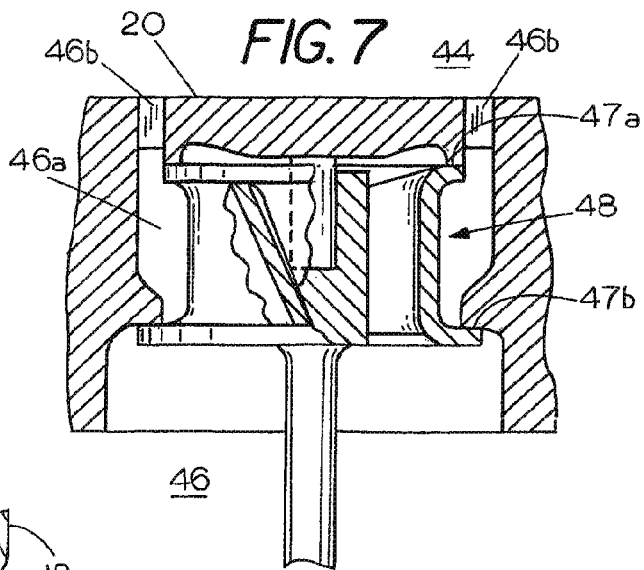
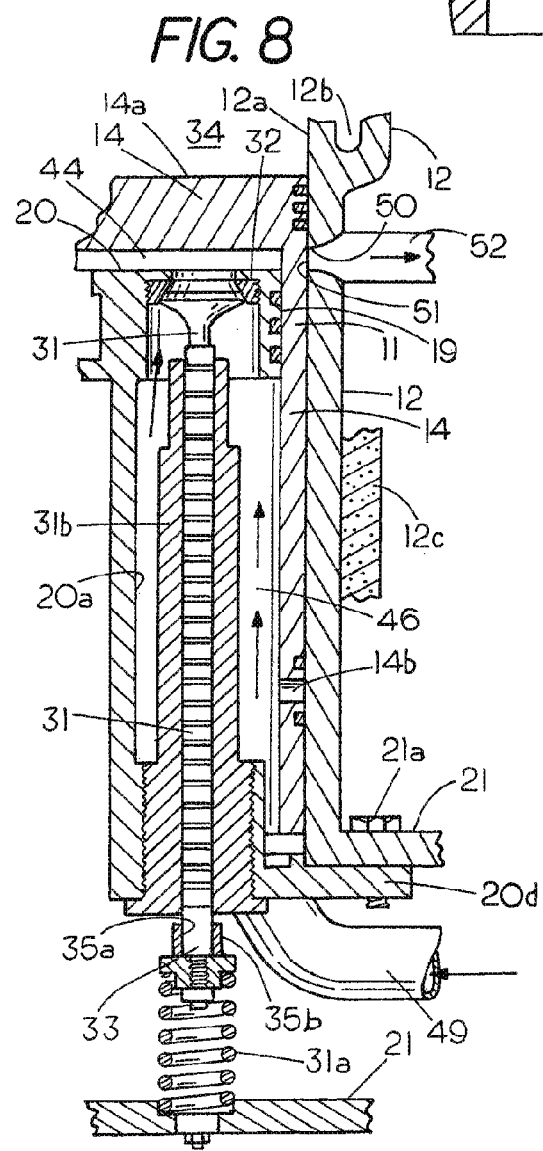

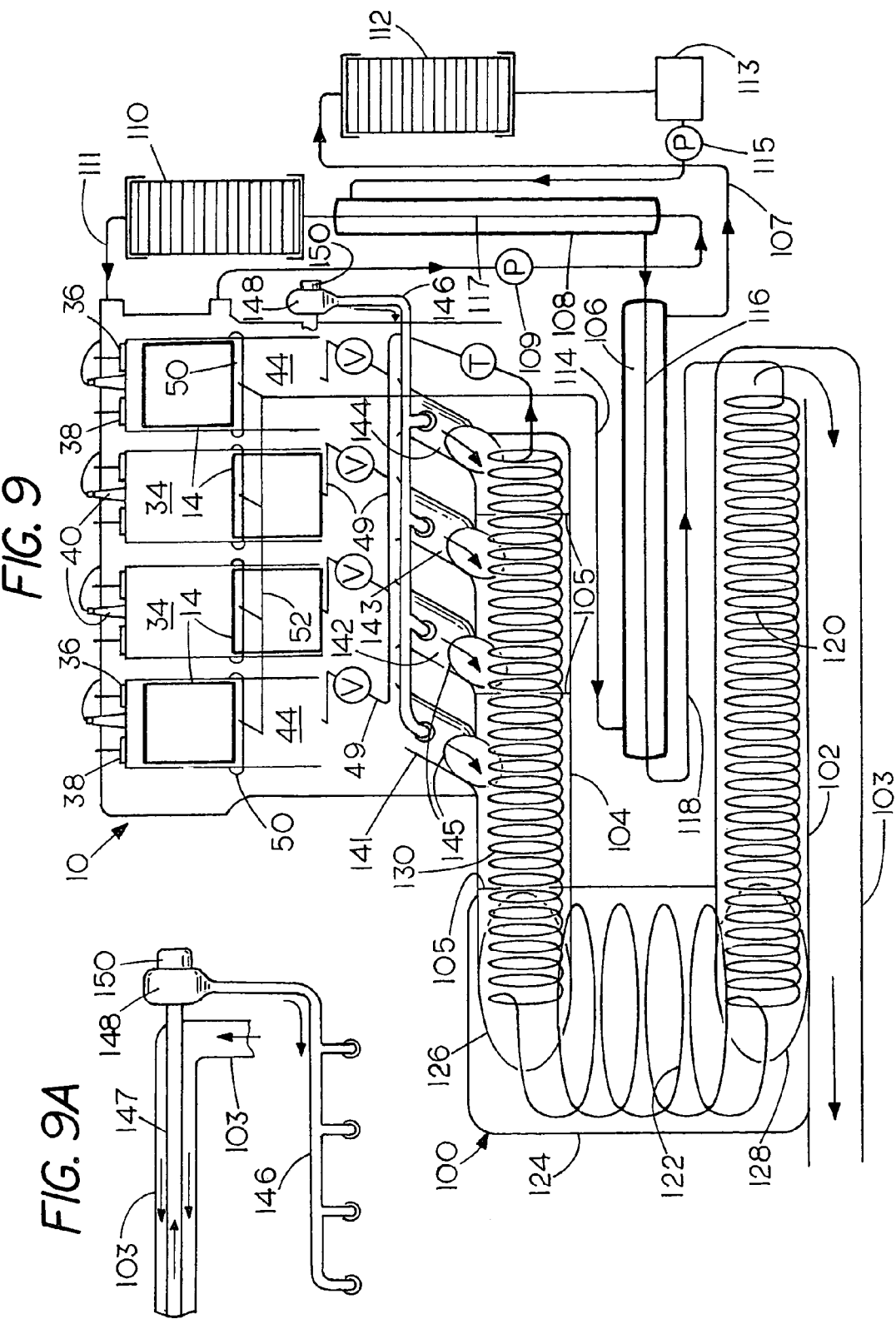
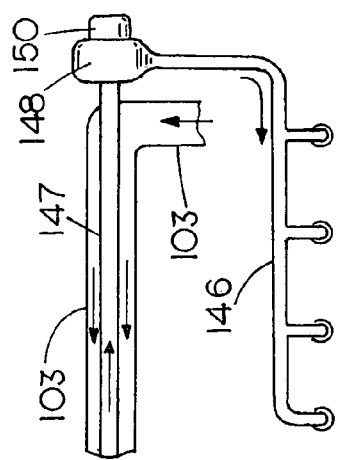
FIG. 9
FIG. 9A

HIGH EFFICIENCY DUAL CYCLE INTERNAL COMBUSTION ENGINE WITH STEAM POWER RECOVERED FROM WASTE HEAT

This application is a continuation-in-part of Ser. No. 12/075,042 filed Mar. 7, 2008, now U.S. Pat. No. 7,997,080. The applicants claim the benefit of the following provisional and non-provisional applications entitled INTERNAL COMBUSTION ENGINE WITH AUXILIARY STEAM POWER RECOVERED FROM WASTE HEAT, Ser. No. 60/905,732 filed Mar. 7, 2007; Ser. No. 12/075,042 filed Mar. 7, 2008 (Pub. No. 2008/0216408A1) now U.S. Pat. No. 7,997,080; Ser. No. 61/192,254 filed Sep. 17, 2008 and Ser. No. 61/194,608 filed Sep. 29, 2008 which are incorporated herein by reference.

FIELD OF THE INVENTION

This invention relates to internal combustion engines with supplemental steam power obtained from waste combustion heat and to a combination internal combustion (I.C.) engine and steam engine.

BACKGROUND

Internal combustion engines although highly developed, dependable and relied upon for almost all road transportation throughout the world generally lose about 72-75% of the fuel heating value through radiation, engine coolant and exhaust. The measured brake horsepower of a typical six-cylinder spark ignition automobile was only 21% of the fuel heating value at 72 MPH and only 18% at 43 MPH, *Internal Combustion Engine Fundamentals*, J. B. Heywood, McGraw Hill 1988 pg. 675. Meanwhile, increasing fuel prices and shortages mount steadily as world supplies dwindle and air pollution problems continue. While there have been several attempts to provide greater efficiency in an internal combustion engine by recovering energy from waste heat, prior proposals have had marked shortcomings. One prior system developed by BMW International (U.S. Pat. No. 6,834,503) requires, in addition to the internal combustion engine, an entirely separate steam expander that is connected to the internal combustion engine by a belt to recover power from engine coolant and an exhaust powered steam generator. This arrangement adds considerably to the size, weight and expense of the power plant as well as placing limitations on thermal recovery. Because of space constraints in a vehicle, the volume and weight of the complete unit is critical. Porsche AG developed a waste heat turbine that was geared to an I.C. engine (U.S. Pat. No. 4,590,766).

The present invention aims to provide a way to recycle steam continuously in a closed circuit (no steam exhaust) through a high efficiency expander where economy of operation is the prime consideration while the same time improving I.C. emissions. Attempts have been made to combine a gas and steam engine for recovering waste engine heat, examples of which are the Still engine (GB Patent 25,356 of 1910 and 28,472 of 1912 and U.S. Pat. No. 1,324,183) and Mason U.S. Pat. No. 3,921,404. Still has a cylinder cover below the piston that provides a thin annular chamber which allows steam to flow in and out between the cover and the piston from an opening in the cylinder wall. In a counterflow engine, steam pressure throughout the entire exhaust stroke falls close to atmospheric during the entire exhaust stroke producing a drop in steam temperature which cools cylinder walls allowing condensation of the steam admitted on the next power stroke. This robs the engine of power that would otherwise be available by reducing the mean effective cylinder pressure of the incoming charge of steam. However, the efficiency of steam engines operating on what is known as the uniflow principle achieve much greater efficiency than in a counterflow steam engine by reducing the condensation of steam. The inventor of a steam-only uniflow engine described in U.S. Pat. Nos. 2,402,699 and 2,943,608 reported tests showing a thermal efficiency of 38.2% at 3450 RPM. A double acting hollow piston uniflow engine is described in *Marks Standard handbook for Mechanical Engineers*, 1987 Section 9-37 as the "last great improvement in design" but it is unsuited for use as a combination internal combustion and steam car engine in part due to overheating of the piston.

One object of the present invention is to provide a combined internal combustion and steam engine that overcomes thermal inefficiencies inherent in prior combination engines but has the advantage of utilizing I.C. components (piston, cylinder, connecting rod and crankshaft) and efficiency gains that result from sharing some of the I.C. mechanical losses as well as having a compact unobstructed combustion chamber without pockets or extensions as present in an F head (opposing valve) engine thereby permitting a high performance, high compression four I.C. valve hemispherical chamber construction. A more specific object is to provide a combination engine in which internal combustion and steam act on the same piston without steam condensing on the cylinder or piston walls or heads upon admission so as to eliminate condensation losses previously inherent in prior double acting combination engines. To accomplish this, the invention must provide an I.C. steam engine with protection against losses inherent in filling the clearance space or those due to chilling of steam chamber walls by low-pressure exhausted steam as good or better than in what as known as a uniflow engine. An important requirement in a double acting I.C. and steam engine is the need for a mechanism that uses the least possible added cylinder length to minimize engine size and weight. However, it is also necessary to prevent burnt I.C. gas/oil and blow-by gas from contaminating the steam and thereby reducing steam generator and condenser efficiency. The invention aims to add as little as possible to the cylinder length to accommodate steam yet not contaminate the steam with oil or combustion products. Another general objective of the present invention is to provide a power source for more efficiently utilizing waste heat that is built into the internal combustion engine itself so that a separate steam engine or expander is unnecessary, making possible better recovery of waste energy from the internal combustion engine as well as a reduction in the over-all volume of the power unit and its production cost together with improved operating flexibility so that the engine is well adapted for powering vehicles especially cars, buses, trucks, locomotives or aircraft. It is a more specific object of the present invention to obtain the outstanding efficiency advantages of a combustion piston having an adjacent steam chamber that is able to provide both an effective zero steam chamber clearance and a gain in mean cycle temperature. Another object is to make possible reliable steam admission timing while providing variable steam cut-off in an engine that derives power from steam and combustion acting upon a piston yet is flexible enough to operate efficiently with large variations in load and steam generator output. Yet another object is to more efficiently recover lost combustion heat by conductive transfer to a working fluid within the engine itself as well as a more efficient way of recovering waste heat from I.C. engine coolant and from engine exhaust gases. Another more specific object is to provide a way to capture and remove oil and blow-by gas before it can enter a steam line. Still another object is to find a way to accurately vary steam cutoff in an internal combustion-steam hybrid engine while being able to recompress residual steam to throttle pressure within a combustion piston.

These and other more detailed and specific objects and advantages of the present invention will be better understood by reference to the following figures and detailed description which illustrate by way of example but a few of the various forms of the invention within the scope of the appended claims. Topic headings are for convenience of the reader and not intended to be in any way limiting.

BRIEF DESCRIPTION OF THE DRAWINGS

FIG. 7 is a partial vertical cross sectional view of the steam cylinder head or cap on an enlarged scale to show the double seated balanced poppet valve;

FIG. 8 is a vertical sectional view showing another form of steam admission valve;

FIG. 9 is a schematic diagram of the invention as applied to a 4-cylinder car engine showing steam circulation;

FIG. 9A is a schematic diagram to show the source of supplemental combustion air fed to the afterburner;

SUMMARY OF THE INVENTION

Figure 1:
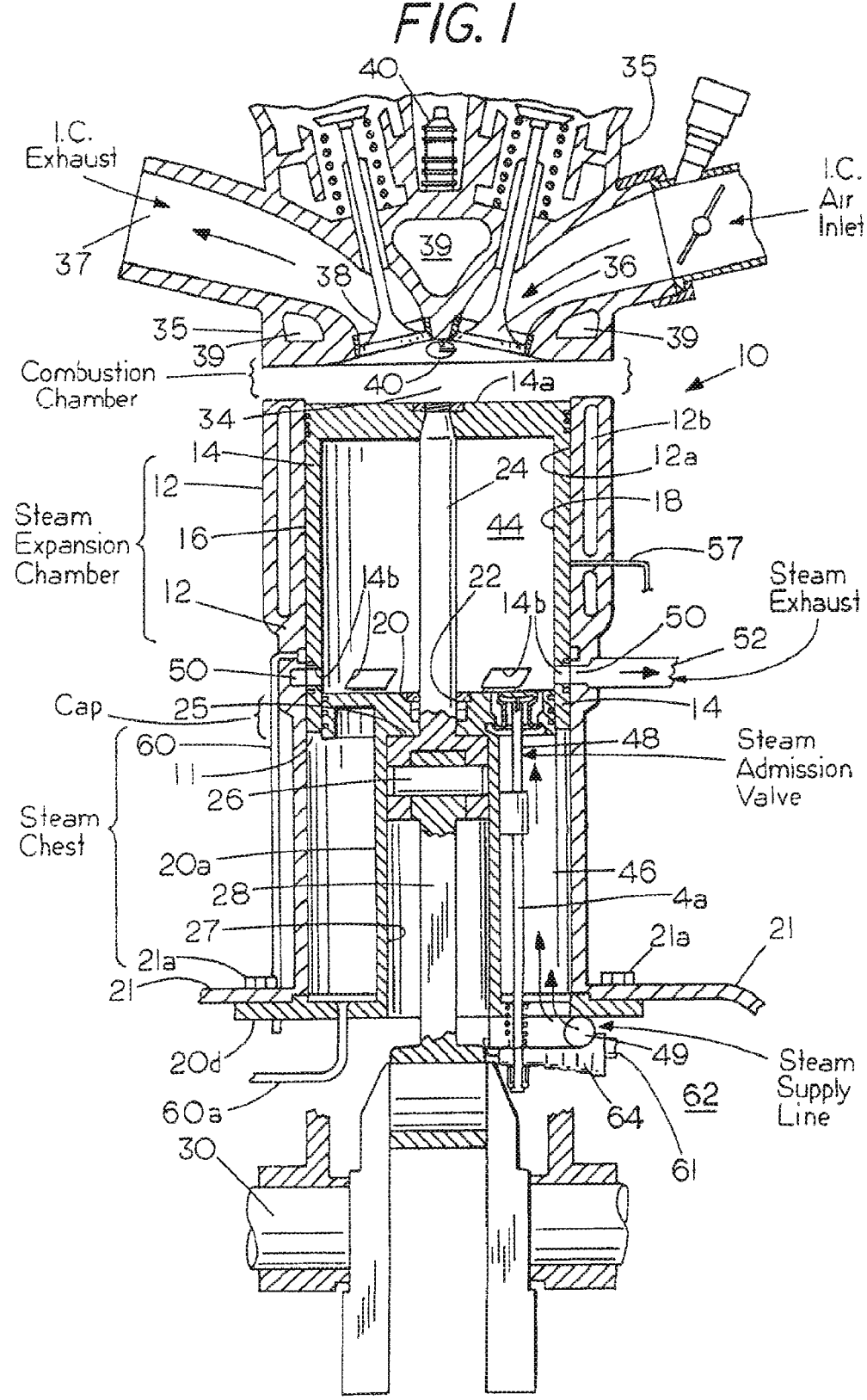
FIG. 1 is a semi-diagrammatic vertical sectional view of one cylinder of an engine in accordance with the invention with the combustion cylinder head elevated and rotated 90 degrees about a vertical axis to show the valves, the piston being shown at the top dead center position.

This invention concerns a high efficiency composite internal combustion and steam engine especially suited for use in cars and trucks which includes one or more combustion chambers for burning fuel to power a piston by combustion as well as at least one expandable chamber within the engine that is powered by steam generated from what would have been waste heat from the combustion chamber. Previous systems for recovering waste exhaust heat and waste heat from the combustion chamber coolant in a dual cycle engine have been inefficient. To overcome this and other deficiencies, the present invention provides a combined cycle engine which employs the advantage of using high temperature, i.e. superheated steam with a way of accomplishing uniflow steam operation inwardly of each internal combustion piston to improve operating efficiency as well as benefiting from a way to provide variable steam cutoff through the use of one or a pair of series connected, inwardly retractable, steam pressure balanced valves that are located in a cylinder cap which is sealed within each piston operating in cooperation with steam recompression and a provision for achieving effective clearance volume changes that vary with engine speed to thereby further increase efficiency and the specific power output from the waste heat energy recovered. In one example of a cutoff control, a camshaft is coupled for changing the phase of one or a pair of steam admission valves to vary valve overlap, thus providing continuous regulation of the steam cutoff to further reduce specific fuel consumption. Depending upon the application of the engine, the cylinder cap which is placed adjacent to a steam exhaust port can be unheated but if advantageous is capable of being heated to the temperature of the superheated steam supply or, if desired, can have a device for providing an intermediate controlled degree of heating to provide optimum power. Engine coolant can be evaporated in the engine-cooling jacket to form steam which is then superheated by I.C. exhaust gases within an engine exhaust manifold for powering the steam expansion chamber within each piston. Heating of the cylinder cap makes it possible in some engine applications to achieve high efficiencies which surpass those in what is known as a uniflow steam engine to provide additional power from waste combustion heat; an efficiency level that is much higher than in an ordinary counterflow steam engine. The engine also has the flexibility needed under non-uniform steam generator pressure and engine load conditions that occur in vehicles through a provision for variable steam displacement. Another aspect of the invention concerns a more efficient way to recover combustion heat that is contained in the combustion chamber coolant and in the I.C. exhaust gas using an exhaust powered superheater comprising an engine exhaust manifold for supplemental combustion of unburned fuel while also providing for the direct conduction of the heat produced in the combustion chamber to increase the enthalpy of expanding steam within the steam expansion chamber inside of each piston. The invention thus provides an improved heat recovery, heat exchange, steam generator and superheater system for generating steam with a way to better construct a steam expansion chamber, steam cylinder head and valving, heated steam exhaust area, a provision for steam recompression to admission pressure inside of a combustion piston so as to achieve an effective zero clearance and a gain in mean Rankine cycle temperature along with a steam supply arrangement that is able to act on each piston within an I.C. engine so as to more effectively economize on fuel, make a more efficient combined gas and steam engine, balance the steam displacement with steam generator output to use steam more efficiently, and provide other features that will be apparent from the following description.

DETAILED DESCRIPTION OF THE PREFERRED EMBODIMENTS

Refer now to the drawings. Shown diagrammatically in FIGS. 1-8 is a combination internal combustion engine and steam engine 10 that has a cylinder 12 containing a cup shaped trunk style piston 14 which, unlike ordinary pistons, is machined and ground to precise tolerances both outside at 16 as well as in the inside at 18 and is positioned to reciprocate within an annular space 11 between the inside wall 12a of the cylinder 12 and a stationary steam cylinder head. While a single cylinder and piston is shown for convenience in some views, the invention is of course applicable to multi-cylinder engines as well.

Figure 2:
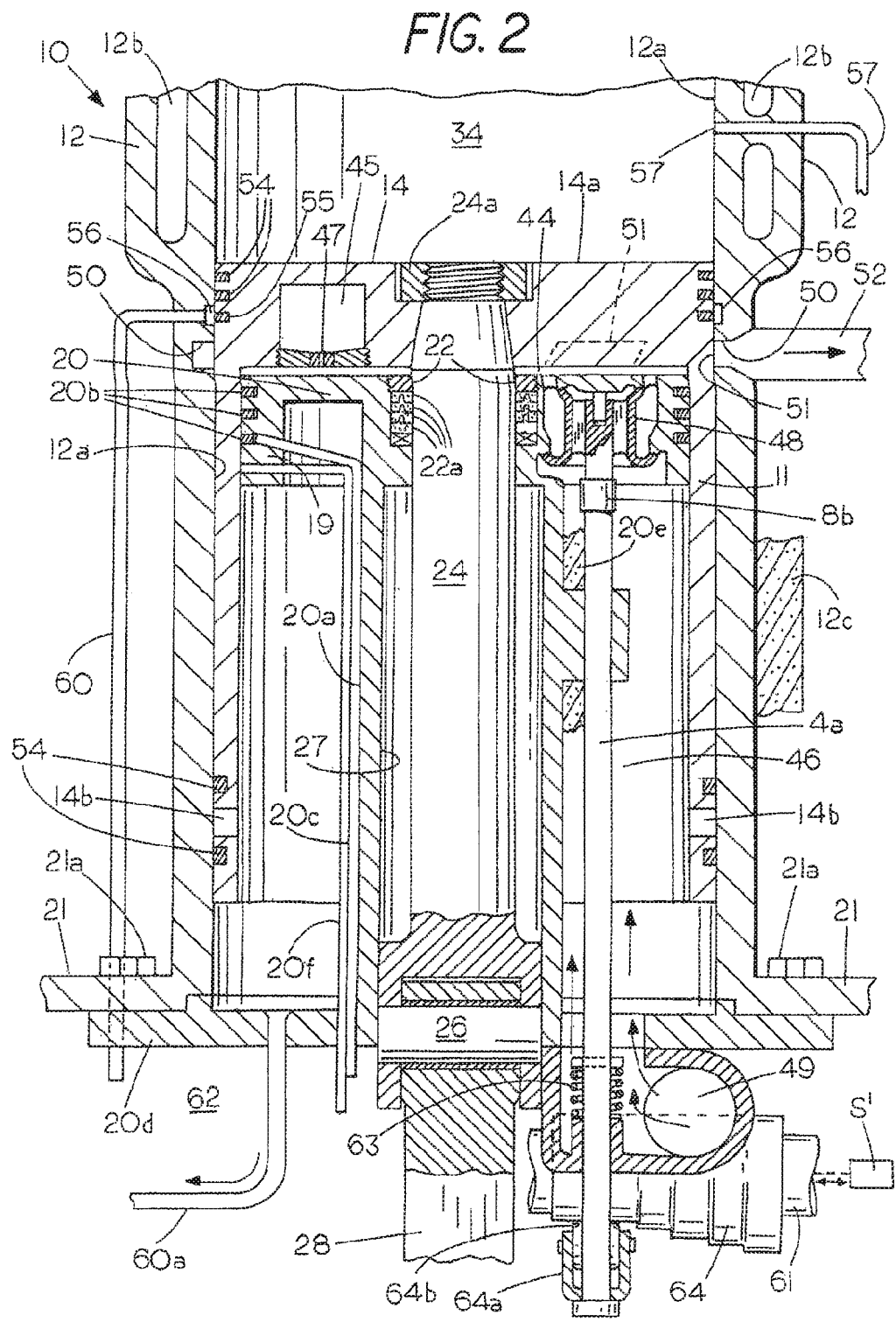
FIG. 2 is a partial view of the lower half of the cylinder of FIG. 1 on an enlarged scale showing the piston at the bottom dead center position.
Figure 3:
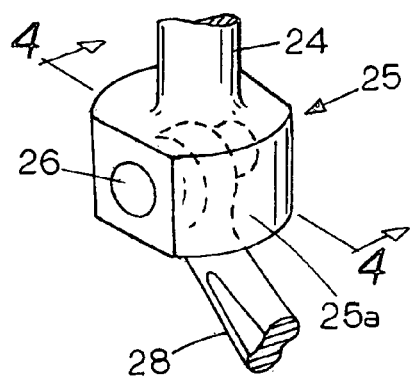
FIG. 3 is a perspective view of the crosshead and upper portion of the connecting rod.
Figure 4:
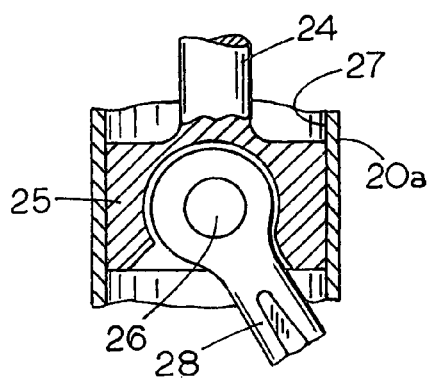
FIG. 4 is a transverse vertical sectional view of the crosshead taken on line 4-4 of FIG. 3, also showing the crosshead guide column.
Figure 6:
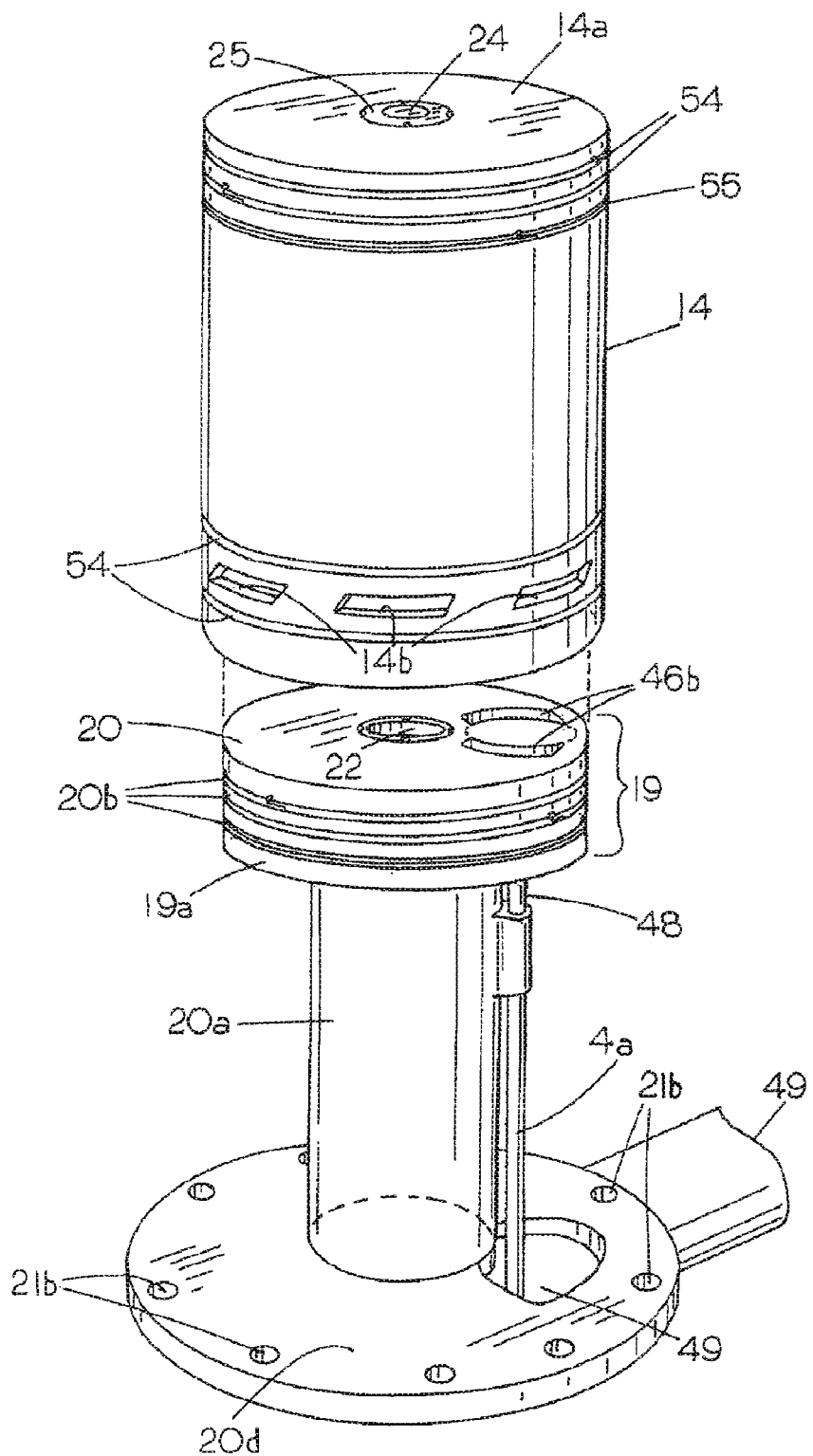
FIG. 6 is an exploded perspective view of the steam cylinder head or cap and piston.

The steam cylinder head which is located within the piston 14 comprises a flat hub, disk or circular cap 20 that may be, say, ¼ to ½ inch in thickness supported at the free upper end of an integral crosshead guide column 20a which is secured to the crankcase 21 by bolts 21a (FIGS. 1 and 2) that extend into openings 21b (FIG. 6) in base 20d shown at the lower end of column 20a in FIGS. 1, 2 and 6. The disk or cap 20 acts as a top or end cap for the guide column 20a as well as one end of a steam chamber 44 and has at its outer edge a cylindrical surface 19a as a part of a downwardly extending collar 19 that is dimensioned to provide a sliding fit within the piston 14 and is grooved to support compression rings 20b which provide a sliding seal with the inner cylindrical surface of the piston 14. It can be seen that the cap 20 traverses the cylinder 12 in a location that is spaced from its ends. Mounted within the cylinder cap 20 between the outer surface 19a and the center of the cap 20 is the steam inlet valve 48. The space between the column 20a and the cylinder 12 comprises a steam chest 46 containing high-pressure, high temperature steam at substantially throttle pressure which is admitted to the steam expansion chamber 44 below the piston 14 when valve 48 is opened, driving the piston 14 upwardly. Cylinder 12 can be independently bolted to the crankcase 62, if desired, to accommodate steam's thermal disparities rather than being cast en block as shown.

At the top of cap 20 is a bushing 22 suitably sealed with packing for a piston rod 24 which is secured to the piston by a nut 24a that can be notched for a spanner wrench. The piston rod slides through the bushing 22 and is secured to a connecting rod 28 for transmitting power to a crankshaft 30 inward of the piston. At the inner end of the piston rod 24 is a piston style crosshead 25 with a partially cylindrical outer surface 25a (FIG. 3) that slides within an inner cylindrical bore 27 of the cap supporting column 20a which serves as a crosshead guide to take up the side thrust of the connecting rod 28. Consequently, piston friction is reduced and piston slap common to most I.C. engines is eliminated. The crosshead is coupled to the connecting rod by a wrist pin 26. The alloys used in the piston 14 and cap 20, are selected to provide a predetermined balanced amount of expansion during startup. When an aluminum piston is used, the interior wall 18 can be electroplated with porous chromium by a well-known method or covered by a steel sleeve 14d (FIG. 19) to provide a hard piston ring contact surface. The steel sleeve can be spaced slightly from the aluminum piston skirt in most places to reduce weight and heat loss from steam within chamber 44. In operation, the skirt of the piston 14 reciprocates in the annular space 11 between the cylinder wall 12 and the cap 20 as steam is admitted into the steam expansion chamber 44 inside the piston from the steam chest 46 through the admission valve 48 to raise the piston.

A conventional internal combustion chamber 34 above the piston crown 14a of the piston 14 is enclosed at the top of the cylinder by a cylinder head 35 (shown 90° out of rotational alignment with the cylinder so that the valves can be seen) which has an inlet valve 36, an exhaust valve 38 and port 37, chambers 39 for coolant circulation, and a spark plug 40 operating as a four stroke (Otto) cycle I.C. engine that burns gasoline or other fuel in the combustion chamber 34 but which can be a diesel engine or a two stroke cycle engine, if desired. The combustion chamber 34 is cooled by a coolant at 39 circulated through a water jacket 12b of the cylinder 12 is compact, unobstructed, has no side pockets and, if desired, can even be of high performance, high compression, four overhead I.C. valve hemispherical construction to avoid detonation.

Within the wall of the cylinder 12 and extending around it nearly in alignment but slightly above the top of cap 20 is a steam exhaust manifold 50 which communicates with the interior of the cylinder 12 through spaced steam exhaust ports 51. It can be seen in FIG. 2 that the steam inlet valve 48 and steam exhaust ports 51 are located in approximate lateral alignment but the exhaust ports are outward of the cap 20 at a slightly higher elevation. In operation, exhaust gas expelled through the exhaust port 37 of the I.C. engine passes through a steam generator to be described below which recovers waste heat by boiling water or other heat transfer liquid to form steam that is admitted by the inlet valve 48 into the steam expansion chamber 44 within the piston from the steam chest 46 through an inlet passages 46a and 46b (FIG. 7). Exhaust steam escapes through the steam exhaust manifold 50 to low-pressure steam return line 52 when the piston reaches the top dead center position as piston exhaust openings 14b in the piston skirt become aligned (FIG. 1) with ports 51 to act as an automatic exhaust valve, thus, in effect, providing a self-contained steam engine below each piston 14 of the I.C. engine. It will be noted that the automatic exhaust valve opens and closes while the steam chamber 44 is in an expanded state. Exhaust steam is condensed, then reheated and continuously recirculated back to the steam expansion chamber 44 in a sealed circuit that is separate from the I.C. engine intake and exhaust gas thus seldom requiring replacement.

It can be seen that the cap 20 serves as the lower (steam) cylinder head for the steam expansion chamber 44, seals the chamber, provides support for the steam inlet valve 48 and establishes the clearance volume of steam chamber 44 which is purposely kept small to insure efficient operation (see FIG. 2 which shows the piston at the bottom dead center position). It is important to note that since both the inside top wall of the piston and top wall of the cap have the same shape (a flat plane), the clearance volume can be made as small as desired. The arrangement of chamber 44, cap 20, steam chest 46, and piston 14 as shown makes it possible for the entire lower end of the steam expansion chamber 44 to be steam jacketed including the steam inlet valve 48 and the top surface of the cap 20 which may therefore, when desired, be kept close to the elevated temperature of the steam chest 46 e.g. 1000 P.S.I.@ 850° F. thereby preventing loss of power due to chilling or steam condensation on those parts within chamber 44. It will be noted that the exhaust ports 51 unlike uniflow ports of an ordinary steam engine are located on the cylinder wall adjacent to a heated engine surface, namely, the cylinder cap 20, all of which except around piston rod 24 can be heated externally throughout operation when advantageous by the steam chest 46. Low-pressure steam is exhausted through line 52 when chamber 44 is over 50% and preferably over 75% expanded to its full volume. As illustrated, the exhaust will begin to open when chamber 44 is about 89% fully expanded. After port 51 closes, throughout substantially the remaining inward stroke of the piston, residual low-pressure steam is recompressed to reach admission pressure. To reduce heat loss, the wall of the guide 20a can be made of two concentric tubes with a dead air space between them.

The construction shown in FIGS. 1-8 produces a marked improvement in operating efficiency compared to a conventional counterflow engine. For example, assuming a 800 p.s.i. throttle pressure and a 10% cutoff, the uniflow steam rate of the engine described and shown in FIGS. 1-8 is calculated to be 8.2 lb./HP-Hr, while in an equivalent counterflow engine the steam rate is calculated to be 11 lb./HP-Hr so that the invention is able to make possible a 25% improvement. At a 12.5% cutoff, the engine of FIGS. 1-8 is calculated to have a steam rate of 8.3 lb./HP-Hr. vs. 10.4 for a conventional counterflow engine (a 20% improvement).

The piston, steam exhaust valve and cap 20 are constructed to enable the inward stroke to bring residual steam up to the admission pressure. This produces an effective zero clearance in chamber 44 so that the entire steam mass as it enters is totally consumed by admission and expansion work and is therefore more efficiently utilized while at the same time achieving a gain in mean cycle temperature. Efficiency can be better than a uniflow steam engine because unlike the uniflow engine, where the piston surface adjacent the exhaust valve cannot be heated, here the entire adjacent cap 20 (FIGS. 1 and 2) above high-pressure steam chest 46 can be externally steam jacketed and thus heated continuously when it is advantageous by the steam chest 46 so as to prevent chilling the incoming charge of steam. It is of salient importance to note that the invention enables low-pressure steam exhausted through line 52 to be kept away from the heated area below cap 20.

Figure 15:
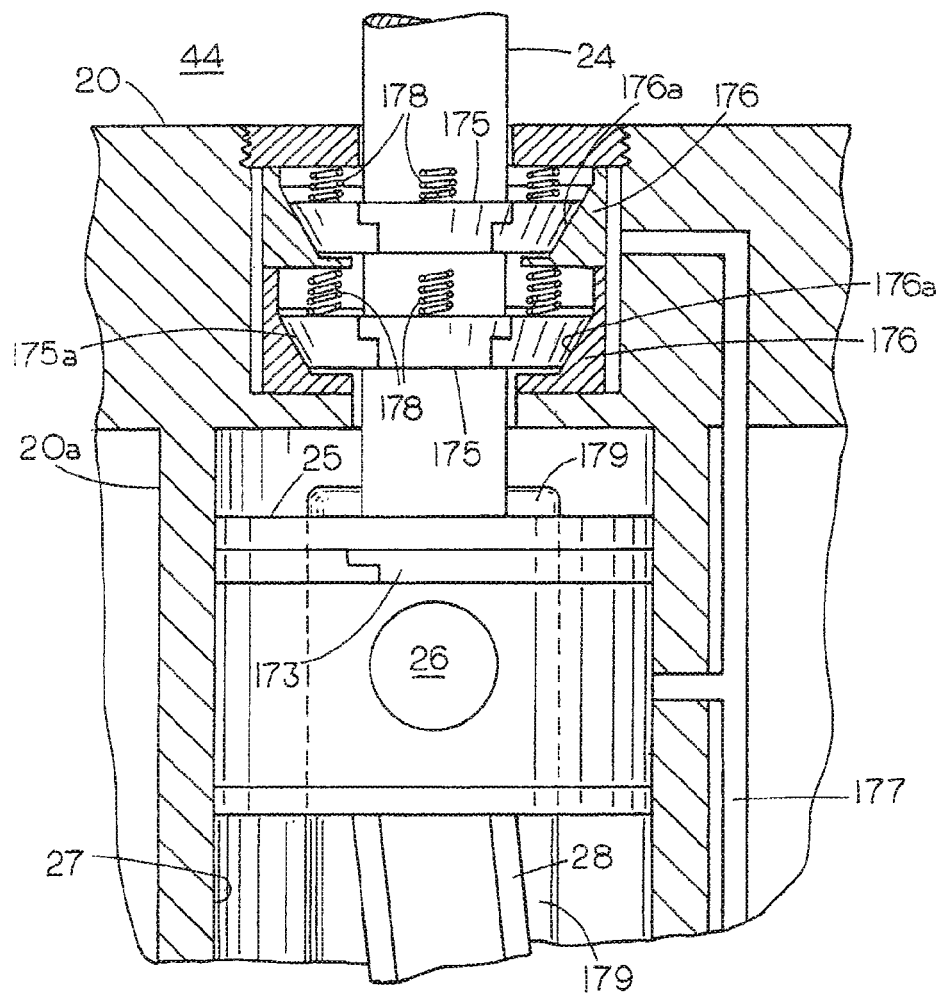
FIG. 15 is a partial vertical sectional view of the center of the cap showing the piston rod packing and crosshead.
Figure 16:
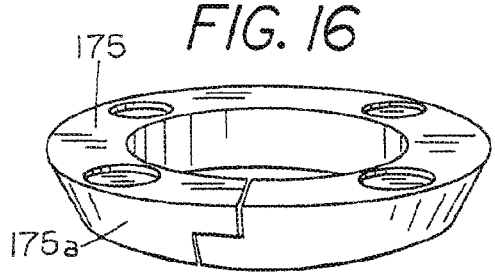
FIG. 16 is a perspective view of one form of metallic packing.
Figure 17:
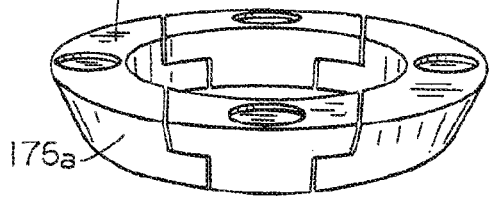
FIG. 17 is a perspective view of another form of metallic packing.

In the past, fiber shaft packing shown at 22a in FIG. 2 of the kind commonly used in steam powered vehicles had to be replaced at regular intervals and became scorched if high temperature steam was used. To avoid these problems, to prevent condensed steam from seeping into the crankcase and provide long life, an alternative metallic packing 175 can be used, if desired, with superheated steam as shown in FIGS. 15-17. Packing 175 is composed of a soft alloy such as Babbitt or other metal alloy used in marine steam engine packing which needs replacement no more often than the piston rings and bearings etc. Each metallic shaft packing ring 175 is provided with sloped outer walls 175a resting on a similarly inclined seat 176a provided within one of two or more stacked bronze rings 176 that open upwardly toward the steam expansion chamber 44. The shaft packing rings 175 can be split for example into four pieces as shown in FIG. 17 or, if desired, can have a single lap joint as shown in FIG. 16. Each packing ring 176 is pressed onto its seat for example by means of compression springs 178 that are mounted in pockets on the top of each ring 175. The slope of the seat 176a is chosen so that the packing will not become too tight causing excessive power to be lost in friction. In operation, the packing rings 175 are able to rise slightly off their seats against the force of the springs. Optionally, the inner cylindrical bore 27 of guide 20a has two opposing air transfer channels e.g. longitudinal recesses 179 facing the wrist pin to permit free air flow around the crosshead except at the extreme upper end of the guide 20a. The metallic packing rings 175 are therefore able to cooperate with the adjacent cylindrical piston type crosshead 25 provided in the example shown in FIG. 15 with an optional piston ring 173 for returning any gas in vapor or liquid back through the packing to the steam expansion chamber 44 when pressure builds up below the packing as the crosshead 25 approaches the top dead center position above recesses 179 to thereby prevent seepage into the crankcase. The packing 175 and 176 shown in the figures can be supplemented, if desired, with an additional ring of fiber packing (not shown). Lubrication is supplied to the packing 175 and to the crosshead 25 through an oil line 177. Alternatively, if desired, a more conventional crosshead (FIG. 3) can be used with flat sides to permit the flow of air around it. To eliminate any potential steam condensation in the crankcase 62, the steam exhaust line 52 can be placed in contact with it for heating the oil in the sump enough to drive off moisture.

Steam Valve Structure

It is essential that the steam engine assembly be constructed in a way that will enable it to operate at relatively high r.p.m.s since a gas engine needs to operate with a piston speed around 3,000 feet per minute. The valves must therefore have a low mass and be free from a tendency to float at high r.p.m.s. While any suitable steam valve can be used, one form of balanced poppet valve 48 is shown diagrammatically by way of example in FIG. 7. The valve 48 is a balanced double seated poppet valve having upper and lower valve faces 47a and 47b each resting on its own seat at the top and bottom of inlet passage 46a within the cap 20. Chamber 44 communicates through inlet passages 46a and 46b with the steam chest 46 when valve 48 is opened. Resistance to movement that would otherwise exist due to high steam pressure is balanced by lower valve face 47b which is slightly larger than valve face 47a resulting in a small upward force from steam that is easily overcome by the cam 64 (FIG. 2). During operation, when the cam 64 lowers the valve 48, steam will flow from steam chest 46 into the steam expansion chamber 44 below the piston 14 through the inlet passages 46a and 46b driving the piston upwardly. If the lower valve face 48b has an o.d. of ¾ inches, its spindle diameter is ⅛ inch, the i.d. of the upper valve 48a is 9/16 inches and the pressure is 750 lb/in.² then the net upward pressure on the valve would be about 130 lbs. plus the spring force. The closing force can be further offset, if desired, by a balancing plunger (not shown) at the lower end of the valve stem. Assuming the difference between the i.d. of the lower seat and the o.d. of the upper seat is 1/64 inch, the resulting downward (opening) force would be 12.4 lb. when the pressure in 44 builds to 750 p.s.i. and 16.5 lb. at 1000 p.s.i. The valve heads can be rotatably mounted on their stems if desired to equalize wear with pitched radial blades as shown in FIG. 7 to impart rotation. To better enable the valve 48 to rotate freely during operation, it can be connected to valve lifter rod 4a, if desired, by a rotary coupling such as a snap ring or ball coupling within a sleeve 8b (FIG. 2). Valve lifter rod 4a opens the valve when retracted by rocker 64a supporting a wheel 64b in contact with a three-dimensional cam indicated diagrammatically at 64 that is shifted axially in operation by a servomotor S¹ which is controlled by a central engine management (C.E.M.) computer 305 (FIG. 14) to optimize the valve cut off. The seats of valve 48 can be flat or conical and of such inclinations that they have a common apex to help assure equality of thermal deformation. Both the valve and the seats can be cast from the same material to assure equal thermal expansion. However, if different metals are used, a known form of Skinner self-expanding poppet valve can be used having spring metal packing rings between upper and lower telescopically related valve parts to allow about 0.003 to 0.004 in. telescopic action. Compared to sliding valves, the double seated balanced poppet valves are especially advantageous since being hollow they have a low mass, require no lubrication, have a relatively small lift (travel) for a full port opening and more adequate admission at very early cut off in a variable cut off operation as here. If desired, two side-by-side valves 48 can be connected by a bridge (not shown) for being opened by a single lifter rod.

FIG. 8 shows an alternative unbalanced poppet valve 31 which is biased upwardly to its seated position against a valve seat 32 above it by spring 31a. Threaded onto the lower end of the unbalanced poppet valve 31 is a sleeve 33 with a boss at its upper end that is lowered during operation by a valve lifter viz, a rocker arm 35b having a bifurcated end with an opening 35a extending around the stem of poppet valve 31 for pressing on the boss to open valve 31. The stem of valve 31 extends through a valve guide 31b which is threaded at its outer end into the base 20d of the cap supporting column 20a. Valve 31 can function as a relief valve on the down stroke when pressure in chamber 44 exceeds that in 46.

Figure 13:
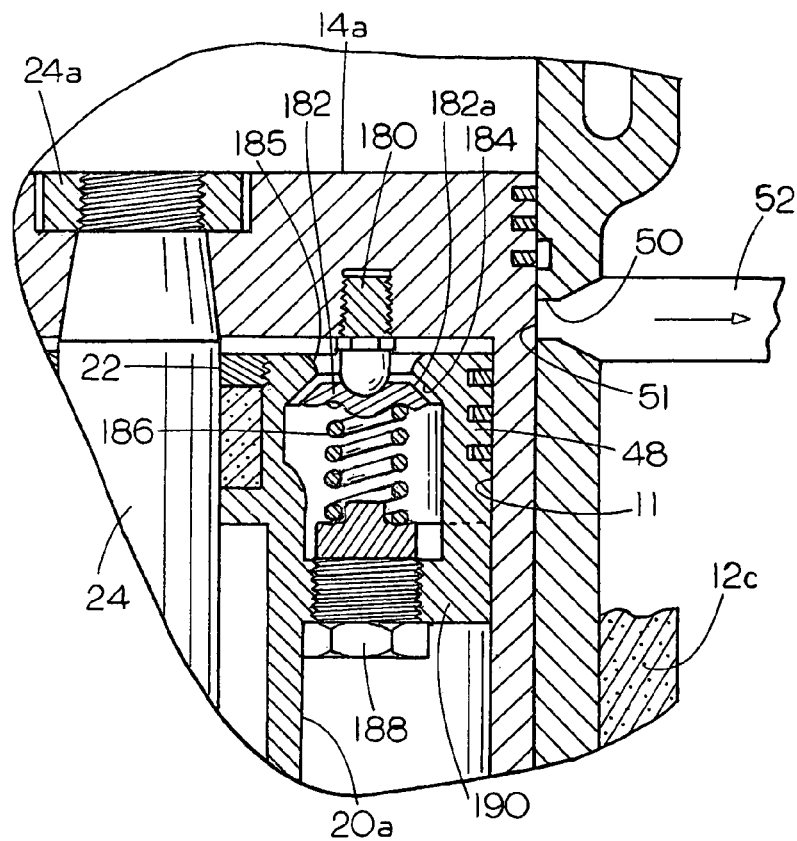
FIG. 13 is a partial vertical sectional view showing a bump valve in accordance with the invention.

Alternatively, in place of a poppet valve, a bump valve 182 (FIG. 13) can be used. The bump valve 182 is opened during operation by a valve lifter 180 threaded into the lower surface of the piston crown 14a in a position aligned with valve 182 so that when the piston descends, lifter 180 will open bump valve 182 by separating its annular valve face 182a from a seat 184 concentric with an inlet port 185 extending through the top of the cylinder head 20 adjacent valve 182. Valve 182 is normally seated by a spring 186 supported by a spring retainer 188 which is threaded through a bridge 190 that is integral with the cylinder head and column 20a. The bump valve 182 provides a fixed cutoff. More than one, e.g. four bump valves can be provided in which case the piston 14 should have four aligned valve lifters 180.

Working Fluid

The working fluid used for producing steam can be distilled or deionized water or mixtures of water and alcohol or other known binary fluid mixtures such as ammonia and water as well as hydrocarbon liquids such as isobutane or isopentane among others which is recycled continuously in a sealed circuit. The term "steam" herein is used broadly to include vapors of these and other working fluids as well as steam from water. To prevent freezing when water is used, a small pilot light which consumes only a quart of fuel per week that has been developed by Saab-Scania, Inc., can be used in cold weather. A self-draining system has also been previously developed to avoid freezing.

Collection of Blow-by Gas and Oil

Figure 5:
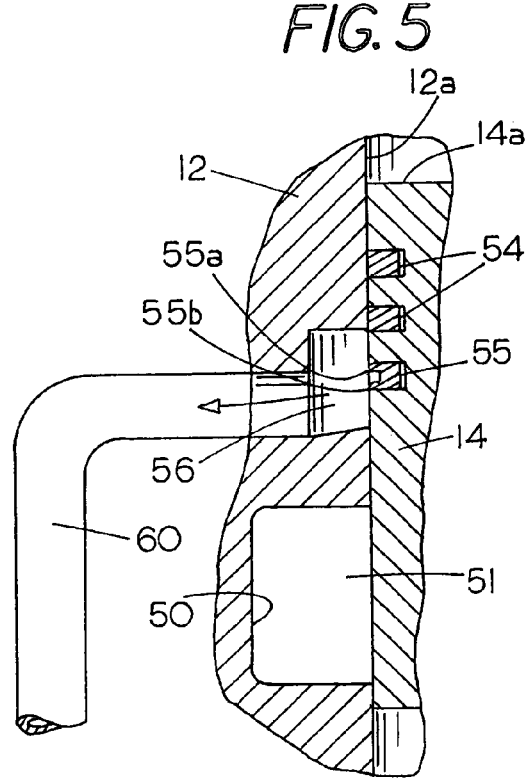
FIG. 5 is a greatly enlarged partial vertical sectional view showing a portion of the cylinder wall and piston at the bottom dead center position.

As best seen in FIG. 5 which shows the piston in the bottom dead center position, the piston 14 is provided with a pair of compression rings 54 and a special oil ring 55 that has a pair of vertically spaced apart strippers with sharp downwardly directed edges 55a and 55b that carry excess oil downwardly through the cylinder to a circular collection channel 56 that has circumferentially spaced ports in the cylinder wall 12a above the steam outlet manifold 50. Throughout operation, the collection channel 56 receives and carries excess oil and blow-by gas to the crankcase 62 through a return duct 60 before it can enter the steam exhaust manifold 50. Any oil that enters the feed water is removed by filtration or by a settling tank or centrifuge (not shown).

Figure 5A:
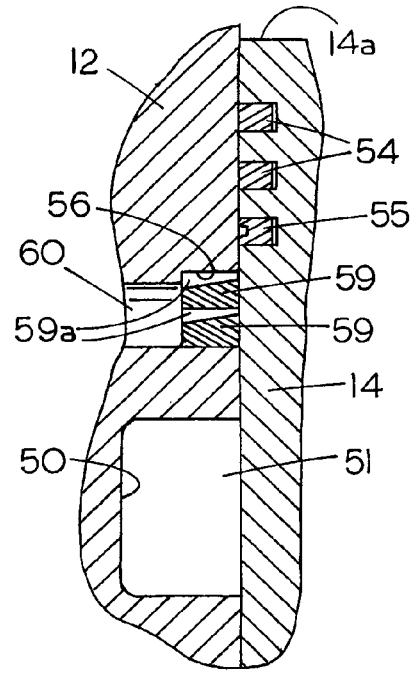
FIG. 5A is a view similar to FIG. 5 to illustrate additional oil rings.

Refer now to FIG. 5a which shows an optional alternate form of oil collection channel. In this alternative embodiment, the collection channel 56 that returns blow-by gas and oil to the sump is a continuous groove in the cylinder wall which is provided with a pair of centrally contracting slotted wiper rings 59 that, unlike ordinary piston rings, have a working face on their interior surface against which the piston slides during operation. If wiper rings 59 are used, the skirt of the piston should be iron or aluminum jacketed within a steel sleeve or plated with porous chromium. The wiper rings 59 rest in contact with one another within the collection channel 56 and press inwardly on the outer wall of the piston. They are pinned in place or to one another with their gaps separated. Each wiper ring 59 has several radial passages or slots 59a through which oil and blow-by gas is carried to the return duct 60 that leads to the crankcase 62. Consequently, the small amount of oil and blow-by combustion gas which is forced past the rings 54 and 55 is caught by the collection channel 56 by wiper rings 59 and is carried to the sump so as to minimize contamination of the steam by combustion gases and waste oil. Remaining oil and particulate matter is removed from condensed steam by filtration and an optional settling tank or centrifugal separator (not shown) if needed. If the centrally contracting wiper rings 59 are used, they can be cut from cast pipe stock of a suitable diameter, then spread outwardly so that the cut ends are separated by a distance of about a ½ an inch enabling the ring to be placed on a circular burnisher of the same diameter as the piston so that the inner working surface can be correctly shaped while expanded to provide a circular inside surface having the same diameter as the o.d. of the piston. Rings can then be pinned to one another with gaps opposite each other to prevent leakage, compressed and installed at the same time.

At the bottom of the piston are two more compression rings 54 (FIG. 2) on opposite sides of piston exhaust openings 14b. All of the piston rings 20b, 54 and 55 are held in place by pins so that their ends will miss the ports in the wall of the cylinder and piston 14.

Sealing the Cylinder Cap and Exhausting Steam

Refer now to FIGS. 2 and 6. To maintain steam pressure in the steam expansion chamber 44, the cap 20 has three compression rings 20b, the bottom one of which can be an oil ring that skims off excess oil from the inside of the piston 14 and returns it through openings in the cap 20 to the crankcase 62 through line 20c. During operation, the piston 14 as already noted has a finished cylindrical e.g. polished inner surface which slides on the outer surface of the cap 20. When the exhaust ports are uncovered by the piston exhaust openings 14b acting as an exhaust valve, any moisture on the top of the cap 20 is swept out of the cylinder rather than being left in it to be evaporated again during the exhaust stroke as is the case in a counterflow engine. As noted previously, on the down stroke, the remaining steam in the cylinder is compressed in the clearance space to the admission pressure. Lubrication is provided between the cap 20 and the piston 14 by pressure feed line 20f that carries oil from an oil pump (not shown). A spring loaded relief or bypass valve (not shown) can be provided in the cap 20, if desired, to prevent excessive pressures in chamber 44 during start up or in case the condenser fails. Any oil or condensate in the steam chest can be removed through drain 60a.

From the steam exhaust manifold 50; the low-pressure steam passes through pipe 52 to a condenser and then to a boiler which will be described below. From the boiler where it is turned to steam, the steam flows through high pressure steam line 49 to the high-pressure steam chest 46 and into the steam expansion chamber 44 through valve 48 thereby completing an endless circuit as it is continuously recycled throughout operation.

Timing Steam Admission

FIGS. 2-8 and 13 illustrate how steam is supplied to the cylinder. The steam inlet valve 48 is opened by a valve rocker 64a extending normal to the plane of the drawing (the free end of which is shown partly in section in FIG. 2) supporting a wheel 64b in contact with a camshaft 61 which is geared to the crankshaft 30 for opening valve 48 each revolution. The rocker is connected to the crankcase by a pivot pin located behind the wheel 64b. Together the camshaft 61, cam 64 and rocker 64a comprise a valve retractor for opening the steam inlet valve 48 against the closing force of steam pressure in chamber 46 and valve spring 63. If mounted on the same camshaft that is used for the I.C. valves, the cams for the steam inlet valves should have two lobes 180° apart so that the steam valves open each revolution. The camshaft 61 can be gear-driven, e.g. using helical gears in a known manner for advancing or retarding the camshaft cam 64 thereby advancing or retarding the steam cutoff. Alternatively, each cam 64 of camshaft 61 is a three-dimensional cam contoured along its length as shown in FIGS. 1 and 2 to provide for different cutoffs by the action of servomotor $S^1$ sliding the camshaft 61 axially (FIG. 2) as described above. For example, each cam 64 is shaped to provide, say, a 5% cutoff at one end and a 50% cutoff at the other. Thus, computer 305 by sliding the camshaft 61 axially can select an optimum cutoff to provide the most efficient operation and the best gas mileage for a vehicle.

Engine Management Control

One example of a controller for adjusting each of the engine operating regulators including the inlet valve cutoff cam 64 by servomotor $S^1$, the operation of steam throttle T by servomotor $S^2$, and the combustion engine operating controls is a central engine management (C.E.M.) computer 305 (FIG. 14) with components of the same general kind as those used in engine controls for cars and trucks. The C.E.M. is connected to one or more input sensors that indicate the condition of operating variables which are used in the present invention for minimizing fuel consumption at each steam generator pressure, engine RPM and loading. The monitored steam engine operating variables are used to continuously control engine operation by adjusting the steam throttle setting T, the variable cutoff cam 64 and other engine operating regulators to maximize heat recovery and to minimize both fuel consumption and the discharge of pollutants. The C.E.M. computer 305 is also used to provide cylinder compounding and to balance engine displacement with steam generator output as will be described more fully below in connection with FIG. 14 under the heading STEAM DISPLACEMENT CONTROL.

Steam Engine Efficiency and Enthalpy Losses

As seen in FIG. 2, the entire top wall of cap 20 above steam chest 46 (typically about 3 to 6 times the top area of column 20a) keeps the cap 20, valve 48 and piston close to the temperature of the incoming steam as noted above. The lower part of the cylinder can be insulated, a small part of which is shown at 12c, as well as the crosshead guide 27 as partially shown at 20e to minimize heat losses from the steam chest 46.

Engines of the type described for example in U.S. Pat. Nos. 1,324,183 and 3,921,404 operate on a counterflow principle in which steam at atmospheric pressure is exhausted as the piston descends. By contrast, the steam engine assembly of the present invention, which is located below the crown of piston 14, is able to surpass even the performance of the uniflow steam engine which is noted for its unusually high efficiency. In a uniflow engine, steam flows out at the center of the cylinder only during the short period of time when the piston uncovers the exhaust ports but the piston ends adjacent the ring of exhaust ports are unheated. In the present invention, the alignment of piston exhaust openings 14b in the piston skirt with exhaust ports 51 in the cylinder wall allow steam to escape briefly to the exhaust manifold 50 surrounding the cylinder 12 at the upper end of each stroke when the chamber 44 is in an expanded state. When the exhaust ports 51 are uncovered, any moisture that collects on the top of the heated cap 20 will be swept horizontally out of the cylinder, rather than being left for re-evaporation. On the down stroke, steam left in the steam chamber 44 is compressed to the admission pressure but unlike the uniflow engine both upper and lower adjacent surfaces of the clearance space 44 are heated (the crown of the piston 14 being heated by the I.C. combustion chamber and the lower end of the cylinder including the cap 20, valve 48, and piston skirt being heated by the high-pressure steam in chamber 46) thereby keeping the cylinder and piston hot. In this way, potential chilling of engine surfaces is prevented more effectively than in the uniflow engine. Steam recompression as in a uniflow engine avoids the intermittent cooling that takes place in a counterflow steam engine while the heating of the cap 20 adjacent the exhaust ports 51 minimizes condensation of the fresh charge of steam thereon, thus maintaining a level of efficiency higher than that of the uniflow engine. FIGS. 2, 7 and 8 show how the cap 20 containing the steam intake valve 48 is steam jacketed to provide heat for keeping the steam cylinder head surface of 20a heated adjacent the ring of exhaust ports 51 throughout operation.

Steam engine efficiency is also enhanced by the direct conduction of heat from the burning gas in combustion chamber 34 through the piston crown 14a of the piston to the steam under the piston. Of the fuel heating energy that is lost when the fuel is burned, about 8% is lost during combustion and about 6% during expansion. Much of this lost heat is transferred into the crown and upper part of the piston and in turn to the steam in chamber 44. The head of the piston can be maintained at a safe operating temperature due to the large volume of steam passing through the chamber below the piston.

To further improve efficiency, and make up for the negative torque on the down stroke (especially at low speeds), the steam chamber 44 is optionally connected to an auxiliary displacement chamber 45 (FIG. 2) in the piston head of, say, 2 in.$^3$ for a steam cylinder displacement of 40 in.$^3$ through a throttling duct or restriction 47 of about 0.18 inch in diameter to act as a variable auxiliary clearance volume for limiting down stroke compression pressure in chamber 44 to throttle pressure at various throttle settings based on a known flow throttling principle so as to provide a greater effective clearance volume at low RPMs due to the greater flow through the restriction while providing reduced flow at high RPMs thereby limiting the charge entering the cylinder. This action provides the effect of an earlier cutoff at high RPMs for increasing Rankine engine efficiency. This feature and the net positive torque of three out of each four strokes provided by I.C. and steam power working together results in a reasonably even running engine. A negative torque of about 10-12% of the net positive torque of the other three strokes will occur only during the I.C. intake stroke. The invention provides more even torque than an I.C. engine for a given number of pistons since the steam below each piston will provide one power stroke per revolution and greater torque at reduced RPMs because steam engines do not need high revs to develop their power. A 4-cylinder engine will have six power strokes instead of two per revolution including four from steam expansion. Chamber 45 also lightens the piston and is self-draining if any condensate is present.

Lubrication can be supplied in any suitable manner, e.g. by means of continuous pressure feed lines 20*f* and 57 (FIG. 2) and 177 (FIG. 15) which meter oil to the cap wall, the piston and cylinder through the cylinder wall as well as by conventional pressure feed through the crankshaft and connecting rod or by a splash or oil jet from the sump (not shown).

Thermal Energy Recovery

Refer now to FIG. 9 which illustrates one preferred form of thermal recovery assembly and method in accordance with the present invention. In a typical I.C. engine, the brake power output is about 25-28% and losses amount to about 72-75% of the heating value of the fuel under the conditions of use (see *I.C. Engine Fundamentals* by J. B. Heywood, 1988 page 674). I.C. energy losses include those from the exhaust, the coolant and miscellaneous losses such as radiation from the engine and exhaust system and exhaust kinetic losses. The system for recovering this thermal energy shown in FIG. 9 includes the engine 10, a steam generator 100, an economizer 102, a steam superheater 104, two countercurrent liquid-to-liquid heat exchangers 106 and 108, a condenser 112 and radiator 110. As outlined above, the low-pressure steam is collected in a chamber or manifold 50 surrounding each of the cylinders and is exhausted through the low-pressure steam return line 52. The steam return line 52 is connected by line 114 to the countercurrent flow heat exchanger or regenerator 106 which can consist of a pair of tubes mounted one inside the other, the inner one being formed from a material such as copper that is a good conductor of heat. Regenerator 106 acts as a secondary preheater for preheating the feed water flowing through the inner tube 116 which is then carried to the economizer 102 through line 118. The economizer 102 can be in steam generator casing 124 but if separate (as shown) better counterflow heat transfer is assured. The economizer 102 in the example shown is a countercurrent flow heat exchanger in which preheated feed water is heated further by engine exhaust gases that flow in heat conductive relationship with the feed water passing through a coil of tubing 120 within the economizer for providing preheated water to the steam generator 100.

While various steam generators can be used, a monotube steam generator or flash steam generator of seamless steel or nickel alloy tubing typically 7/16" diameter coiled in a series of flat spirals or wound to form concentric frustocones or as described in U.S. Pat. No. 5,845,609 is preferred. The coils of tubing 122, in the steam generator, that receive the preheated feed water from the economizer 102 are in this way exposed during operation to the continuous circular flow of hot engine exhaust gas that enters the casing 124 of the steam generator 100 through tangential inlet opening 126 and leaves through a tangential outlet opening 128 in the opposite direction from the flow of feed water and steam through the coil 122 to again provide a countercurrent-flow exchange of heat so that the last of steam to leave the top coil 122 of the steam generator has been heated the most and is exposed to the highest temperature engine exhaust entering through the tangential inlet opening 126 at the hottest part of the steam generator 100. While only a few coils have been shown in the steam generator, many more are used in practice. A length of 5/8 inch o.d. mild seamless steel tubing that makes a total of 24 flat coils of 17.5 feet each totaling 420 feet of tubing (which amounts to 75 square feet of heating surface) can provide a 41 HP steam generator that does not cause excessive I.C. exhaust backpressure losses. Although the steam generator shown and described is preferred, other known water tube steam generators can provide efficient energy recovery. For example, a LaMont flash tube steam generator developed an efficiency of 85% (see *Heat Engines* by R. H. Grundy, 1952 pages 452 & 453) and a Benson steam generator during tests yielded a thermal efficiency of about 90% (see *Theory and Practice of Heat Engines* by D. A. Wrangham 1960 pages 710 and 711). The present invention is able to provide equal or better efficiencies since the temperature of gas in the steam generator 100 is not reduced by dilution with a relatively cool incoming air stream as is the case in an ordinary steam generator in which air is blown by a fan into the burner of the steam generator. The heating rate in a tube type steam generator is also faster than a standard steam generator. Some flash tube steam generators can get high steam pressure in as little as 15-30 seconds which indicates that quite efficient heat transfer is being achieved. A circulation pump in a parallel circuit (not shown) can be provided to maximize heat transfer.

Figure 9B:
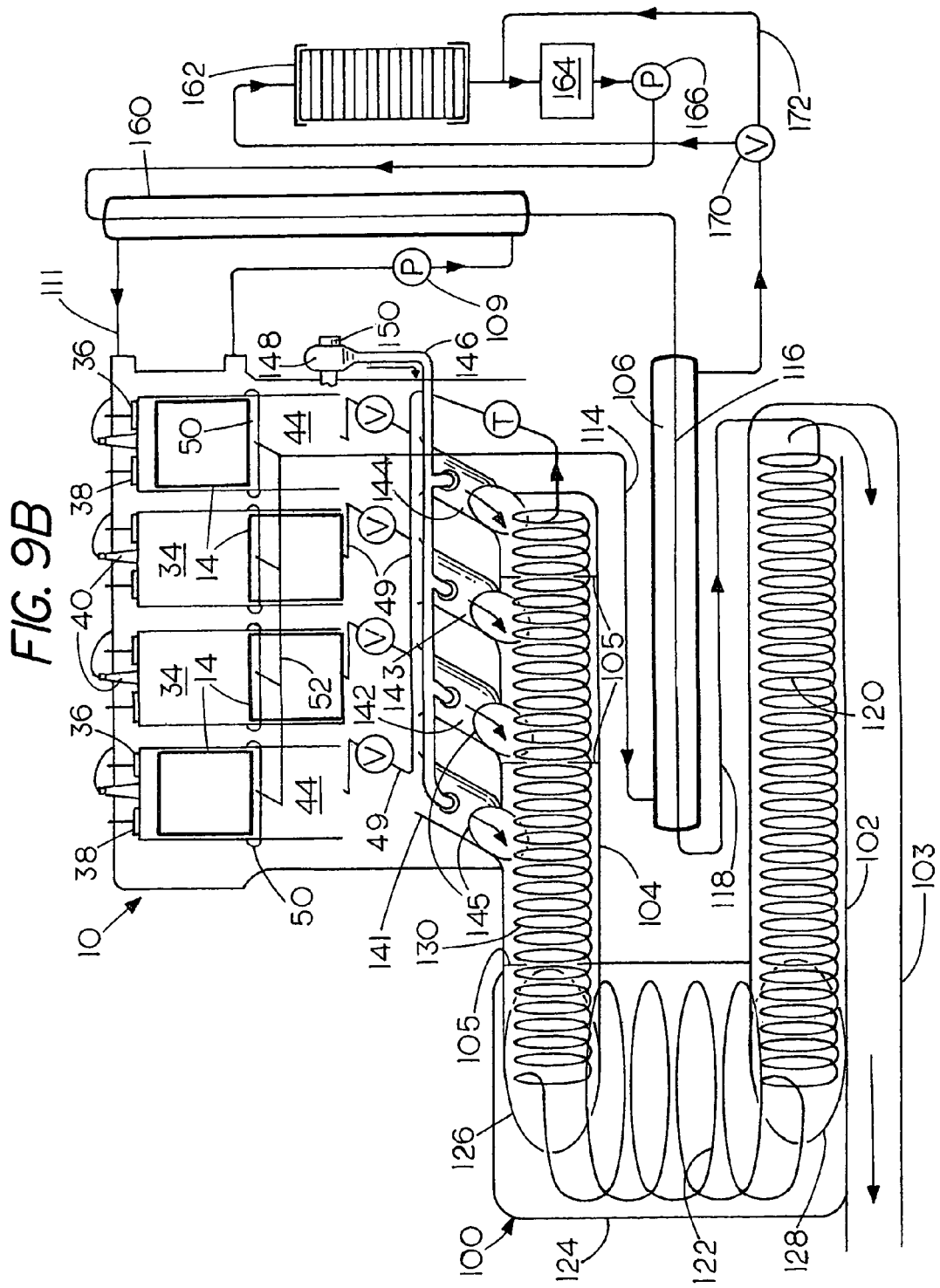
FIG. 9B is a diagram similar to FIG. 9 showing an alternative condenser and heat recovery circuit.

Refer now to FIG. 9B which illustrates a somewhat different circuit for steam and coolant circulation. In FIG. 9B the steam generator, the auxiliary combustor and economizer are the same as already described in connection with FIG. 9 but the following components are arranged differently: condensate preheater 160, condenser 162, filter 164, condensate pump 166 and a thermostatically controlled bypass valve 170. In operation, wet steam and condensate from the regenerator 106 flows through the bypass valve 170 to the top of condenser 162. However, at lower condensate temperatures, valve 170 allows a greater fraction to bypass the condenser 162 through pipe 172 to filter 164 from which it is fed by condensate pump 166 to the first stage countercurrent flow condensate heat exchanger 160 where it is heated as closely as possible to a temperature approaching that of the hot coolant leaving the engine for a maximum temperature gain e.g. to about 100° C.-115° C. Engine coolant itself is fed in the opposite direction by water pump 109 so that upon exiting through pipe 111, it will have transferred virtually all of its thermal load to the condensate while being cooled as it reenters the engine 10 to the temperature of the condensate leaving condenser 162. The bypass valve 170 diverts as little as possible through the condenser 162 for maintaining the condensate and coolant at the optimum design temperature selected for the particular engine 10 that is used. Circulation of the steam to and from the engine through the economizer 102 and the secondary condensate preheater 106 is the same as already described in connection with FIG. 9.

The thermal energy recovery method and apparatus of the present invention, as described above and particularly in connection with FIGS. 9, 9A, and 9B, is outstanding for application in an automobile or other vehicle because of its high efficiency in recovering waste heat and its relatively light weight. However, other heat exchange arrangements are well known as described for example in U.S. Pat. Nos. 4,087,974; 4,201,058; 4,300,353; 4,351,155; 4,803,958; 6,834,503; 6,964,168; 7,013,644, some of the features of which can also be used in recovering waste energy from the internal combustion section of the engine of FIGS. 1-8. All references cited are incorporated herein by reference as fully and completely as though they were reproduced in full in the text of the present application.

FIGS. 9-9B are intended to diagram the circulation of steam and coolant in a general way. Other well known components (not shown) including temperature and pressure sensors, check valves, liquid storage tanks, thermostatic engine coolant valves, fans for radiator/condenser, pressure gauges and relief valves, drains, and the like, all familiar to those skilled in the art are used conventionally. To minimize heat loss, components that are at elevated temperatures are thermally insulated conventionally for example as shown partially in 12c and 20e in FIG. 2.

Superheater Assembly

In accordance with the present invention, a superheater 104 is provided at the location of the exhaust manifold of a standard I.C. engine. The superheater 104 which is somewhat larger than a standard exhaust manifold of an ordinary I.C. engine acts as an afterburner that forms part of an exhaust manifold for recovering additional waste energy while removing some pollutants e.g. CO and hydrocarbons. Inside is a series of coils 130 of stainless steel tubing for superheating the steam produced in the boiler 100 by heat transferred from the engine exhaust gases introduced into the superheater 104 through exhaust gas inlet pipes 141-144 which are themselves connected directly to the exhaust passages 37 in the cylinder head 35. Because the superheater 104 is between the boiler and the cylinders and is connected in close proximity e.g. 2-10 inches from the exhaust ports 37 by inlet pipes 141-144, the coils of tubing 130 inside it are exposed to the greatest heat with steam flowing counter to the flow of exhaust gases. To maximize exhaust gas temperatures while also reducing pollutants, heated secondary air is injected into pipes 141-144 via injectors supplied with air from a blower 148 via air supply line 146. FIG. 9A shows how supplemental air entering pipe 147 is heated by I.C. exhaust pipe 103 as blower 148 transfers it to I.C. exhaust passages 141-144. It can therefore be seen that the coils 130 are exposed to both combustion products; those produced in the engine cylinder as well as those that result from the combustion of unburned gas that takes place within the superheater due to the injection of secondary air. The blower 148 e.g. a positive displacement vane or roots blower can be driven from the engine, by an electric motor 150 or by a small capacity exhaust gas or steam turbine (not shown) connected to line 114. Exhaust gas entering the superheater 104 through the exhaust passages 141-144 can be as high as about 900° C. but the most common range is about 400° C.-600° C. The auxiliary air supply introduced through the supplemental air supply line 146 will oxidize much of the unburned hydrocarbons and carbon monoxide present in the exhaust gas which may amount to as much as 9% of the heating value of the fuel. To optimize combustion and increase residence time, the superheater 104 is made much larger than a standard exhaust manifold, typically around 6-8 inches or more in diameter for a four-cylinder engine. Optional swirl guides 105 with pitched radial blades give the gas a swirling action and increase residence time within the superheater 104 to enhance the combustion of unburned gas which is advantageous since it has been found that a 1.5% CO removal results in a 220° K temperature rise (Heywood Id. page 658). It will be seen that the superheater 104 is an afterburner that is made an integral part of the exhaust manifold itself where the I.C. exhaust gas at the highest temperature enters at several e.g. 4 points with combustion taking place therein where the monotube boiler steam runs in a counterflow direction to incoming exhaust gas to thereby provide superheat at the highest temperature since the monotube boiler line passes through the afterburner, entering furthest from the engine and leaving near the upstream end of the afterburner. It will also be noted that the steam flows from the boiler into the superheater which receives upstream exhaust gases just as they exit the engine and while they are being further heated by the combustion of previously unburned hydrocarbons and other combustible gases resulting from the injection of hot air from the secondary air supply line 146. Consequently, the invention makes possible the recovery of heat from unburned gas and fuel which in an ordinary engine amounts to about 3-9% of the heating value of the fuel.

Briefly, the circulation of steam and condensate is as follows: from the engine exhaust through lines 52 and 114 then, through regenerator 106 and line 107 to the condenser 112. Condensate from the condenser passes through filter 113, pump 115, through the first preheater 108 then through regenerator 106 (leaving at 220° F.-240° F.) to the economizer 102, steam generator 124, superheater 104 then through steam throttle T, high-pressure steam line 49 and solenoid operated selector valves V to the steam chambers 46 and inlet valves 48. The condensed steam is fed by condensate pump 115 from a filter 113 to a primary heat exchanger 108 where it is heated by the engine coolant fed in the opposite direction through a line 117 by a pump 109. Thus, the engine coolant transfers its heat to the condensate first and is then cooled further by passing through the radiator 110 from which it is circulated back through the engine cooling passages 35 and 12b via hose 111.

The driver's foot throttle lever can control the throttle set point as a command to C.E.M. computer 305 which in turn positions the servos $S^1$ and $S^2$ for the cutoff and steam throttle respectively to optimize efficiency and maximize gas mileage continuously while the vehicle is in operation. Engine power can be thus controlled by a combination of steam throttle T and cutoff settings to minimize fuel consumption. Alternatively, the steam throttle T can be operated for example as described in U.S. Pat. No. 4,300,353 with pressure and temperature controlled as described in the Carter U.S. Pat. Nos. 3,908,686 and 4,023,537. The drivers foot throttle can be set to open the steam throttle T before the I.C. throttle is opened to use stored energy, if any, before burning more fuel, with continued movement of the foot pedal then set to open the I.C. throttle.

Steam Displacement Control

One objective of the invention is to operate efficiently at a variable load and steam generator pressure that results from variations in waste I.C. heat and vehicle driving requirements. Some steam generator output accommodation can be accomplished with the variable cutoff 64. However, the invention also includes a mechanism for changing steam displacement to provide the required flexibility under varying operating conditions. In accordance with the invention, valves V are opened sequentially by the C.E.M. computer to increase displacement and are closed sequentially by the C.E.M. computer to as closely as possible match steam engine displacement with the steam output entropy from the steam generator and superheater, the objective being to maintain a more constant ratio between them throughout operation as the engine speed changes during startup and under varying traffic conditions. To accomplish this, an engine load sensor (torque meter) or a steam pressure sensor at the steam generator or cylinder is connected to the C.E.M. computer 305 which opens valves V in a step-wise manner as steam generator output rises. Consequently, when the steam generator output is low, only one or two steam cylinders are used with more added as the steam generator output increases to maintain good efficiency as the heat output of the I.C. engine changes. For example, in a steam powered car, other things being equal, lowering steam engine displacement from an excessive displacement of 200 CID to 140 CID at a constant steam rate of 8.5 lb./HP-Hr. is calculated to improve fuel economy from 9.9 MPG initially to 14.4 MPG (a substantial 45% improvement in fuel economy) by better matching steam generator output and engine displacement.

Figure 14:
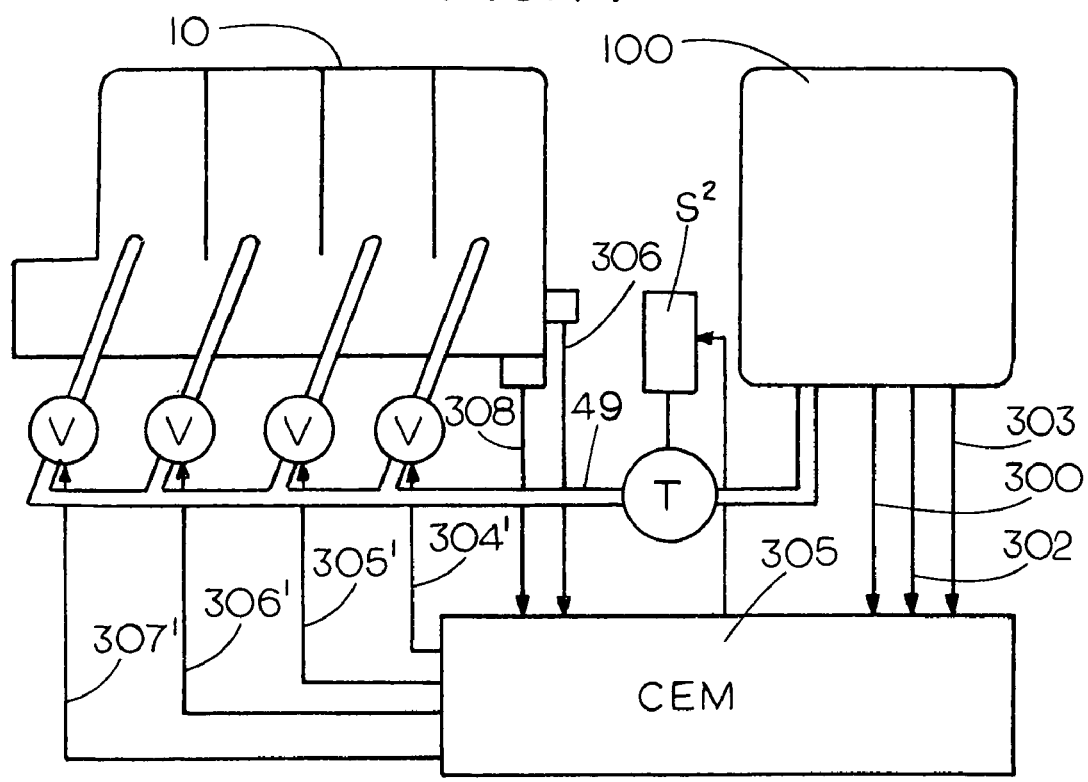
FIG. 14 is a schematic diagram showing the control used for changing engine displacement during operation.

One example of an engine displacement control in accordance with the invention is shown in FIG. 14. It will be seen that steam is fed to the cylinders of the multicylinder engine 10 from steam generator 100 through throttle T via steam line 49 and four solenoid operated valves V to the engine cylinders as described above. The steam generator is provided with sensors for operating variables such as temperature and pressure sensors (not shown) which are connected to the engine management computer 305 by conductors 300, 302 and by conductor 303 for indicating heat supplied to the steam generator (Btu/hr). The load on the engine 10 and engine RPM is transmitted to the C.E.M. 305 via lines 306 and 308. While the engine is running, the C.E.M. carries out real time computation of the optimum engine displacement under existing operating conditions for achieving the best gas mileage. This result is then used to operate the solenoid-controlled valves V via conductors 304'-307'. If each steam cylinder of the engine 10 has the same displacement, then the valves V are opened in sequence to provide engine flexibility with respect to steam generator output by matching displacement with the operating conditions being experienced so as to increase the displacement, e.g. in a step-wise manner from 15 in.$^3$ to 30, 45, and finally 60 in.$^3$ as the steam pressure, temperature or heat supplied to the steam generator increases while reducing the displacement responsive to decreased steam generator output or engine load, all according to predetermined operating parameters for maintaining the best steam engine efficiency under the conditions of operation sensed by the computer while the engine is running as well as before starting or when coasting down. When there is no load on the engine, e.g. when coasting, the throttle T or all valves V are shut by the C.E.M. computer 305 but this is overridden upon depressing the foot throttle. Other operating variables such as I.C. manifold pressure and vehicle speed can be monitored to provide additional operating conditions to the controller 305 as well as those indicated. In designing the engine, the optimum displacement chosen for steam operation can be achieved by selecting a particular piston i.d. or piston rod o.d. If a thicker piston skirt is needed, an optional dead air space can be provided in the piston between the piston skirt and a concentric liner sleeve 14d (FIG. 19) if desired. Admission valves of steam chambers which are receiving no steam can be held open as exhaust valves are held open in U.S. Pat. No. 2,196,980 if desired. To further reduce piston weight and enhance cooling the piston crown can enclose a hollow annular chamber (not shown) containing a quantity of sodium or other heat conductor to promote heat transfer. See Ford U.S. Pat. No. 6,904,876 for a sodium cooled piston and Toyota U.S. Pat. No. 4,712,600.

Steam Cylinder Compounding

It is well known that a compound steam engine can provide greater efficiency at pressures over about 150 pounds per square inch. Using the solenoid operated valves (not shown) between the exhaust line 52 of a cylinder and the high pressure steam line 49 of one or more cylinders, exhaust steam from one cylinder can be sent to a cylinder made with a greater displacement or to two or more cylinders of the same displacement to achieve compounding through automatic control thereof by the C.E.M. computer e.g. from cylinder 1 to both of cylinder 2 and 3 with no receiver.

Heat Transfer and Operating Temperatures

As in any engine, it is necessary to maintain components at temperatures that will not impair proper lubrication. In a typical water-cooled four stroke spark ignition engine that was tested, temperature measurements taken at the top of the piston and at various locations around and behind the top ring varied from about 290° C. to about 340° C. Therefore, running the engine 10 with steam at 300° C.-350° C. should be acceptable for all applications since both aluminum and cast iron pistons can operate with the piston head at temperatures ranging from 200°-400° C. in a standard I.C. engine. The exhaust valve and spark plug can safely run at around 310° C. to 340° C. In the present invention, the I.C. head and cylinder are both water-cooled. Since the cylinder walls of the combustion chamber are cooled by the water jacket, the piston head has the greatest potential for overheating. Heat transfer and cooling of the piston 14 is an important consideration. As seen in FIG. 2, when the steam inlet valve 48 opens, the pressurized steam will stream upwardly and rush across the lower surface of the piston crown 14a and will thereby carry away excess heat as its enthalpy rises. At typical highway cruising speeds as much as about 0.3 lbs. of steam per second will flow across the lower surface of the piston head for carrying away heat so as to avoid overheating of the piston head even though the initial temperature of burning gas in the combustion chamber ranges from 2000° C.-2400° C. It will be noted that the invention makes it possible to conserve energy due to the direct conduction of heat from the combustion chamber to the steam streaming across the lower surface of the piston head as the steam is introduced beneath the piston thereby raising the pressure of the steam while at the same time combustion heat also prevents condensation of the steam on and around the piston head. If desired, the lower surface of the piston head can be provided with cooling fins to promote heat transfer to the steam.

Thermal Losses that are Available for Recovery

The following tables showing fuel energy utilization and loss are derived from Heywood Id. 1988, pages 674 and 675. To evaluate efficiency, brake power is compared with heat transferred to the coolant and to the exhaust as well as other losses that together make up the lower heating value of the fuel being used.

TABLE 1

TYPICAL FUEL ENERGY DISTRIBUTION
IN SPARK IGNITION ENGINES

| | | |
|---|---|---|
| Brake Power | 26% | |
| Lost to Coolant | 23% | Available for Recovery |
| Miscellaneous Losses | 8% | |

TABLE 1-continued

TYPICAL FUEL ENERGY DISTRIBUTION IN SPARK IGNITION ENGINES

| | | |
|---|---|---|
| Sensible exhaust enthalpy | 26% | Available for Recovery |
| Kinetic exhaust enthalpy | 3% | |
| Lost to exhaust systems by radiation | 5% | |
| Incomplete combustion | 5-9% | Available for Recovery |
| | 100% | |
| Total available for recovery: | 54-58% | |

TABLE 2

FUEL ENERGY DISTRIBUTION OBSERVED IN 6 CYLINDER SPARK IGNITION AUTOMOBILE

| | 43 MPH 1100 RPM | 72 MPH 1800 RPM | |
|---|---|---|---|
| Brake Power | 18% | 21% | |
| Coolant Load | 54% | 43% | Available for Recovery |
| Exhaust enthalpy | 21% | 27% | Available for Recovery |
| Misc. radiation from exhaust systems | 2.5% | 3.2% | |
| Incomplete combustion | 4.5% | 5.8% | Available for Recovery |
| | 100% | 100% | |
| Total available for recovery: | 79% | 76% | |

The heat rejection rate to the coolant changes under different operating conditions. In an automobile at low speeds and loads (Table 2), the coolant heat transfer rate is much greater, amounting to as much as 2-3 times the brake power.

Determination of Energy Recovery

For a four cylinder spark ignition four stroke automobile engine operating as set forth in Table 1 and assuming an I.C. engine rated at 100 I.C. HP, the brake I.C. power produced under highway conditions would be 26 HP with 54% of the fuel heating value being available for recovery. Assuming the steam generator is 85% efficient and the steam engine operates as a high-pressure superheated condensing engine having an actual brake power efficiency of 24% (see *Heat Engines*, Allen Bradley, page 407), the combined efficiency is therefore 20%×54 HP or 10.8 HP for an improvement on the order of 41.5%. Using the lost energy percentage values of Table 2 derived from a vehicle traveling at either 43 or 72 MPH, the potential recovery is 20%×79%=15.8% which amounts to an 87% improvement in gas mileage at 43 MPH. At 72 MPH with the energy available for recovery of 76%× 20% efficiency=15.2% of the thermal energy available for a brake power improvement of 72%. Consequently, the improvement in gas mileage that can be achieved through the use of the invention based on empirical test data varies from about 41% to about 87% above the gas mileage otherwise achieved.

Recovery of Unburned Fuel Energy

As already noted, unburned fuel contributes about 3-9% to the waste exhaust gas enthalpy. Burning it can raise the temperature of the exhaust gas as much as 200° K. Running at high speed, engine exhaust from a typical vehicle engine will range from about 400° C.-900° C.

As seen in FIG. 9A, an inlet pipe 147 connected to the inlet of the air pump 148 is in a countercurrent heat exchange relationship with the exhaust pipe 103 for recovering exhaust heat and transferring it to the air that is forced by the blower 148 through the air injector line 146 into each of the exhaust passages 141-144 to supply oxygen for burning hydrocarbons within the superheater 104. The exhaust passages 141-144 enter the superheater 104 through tangential ports 145 which cause the exhaust gases to swirl as they flow through the superheater 104. The swirling action is sustained by the pitched swirl plates 105 which act like a helix to help ensure complete mixing of the hot secondary air so as to achieve total combustion as well as reducing the emission of pollutants. Thus, the tangential inlets 145 begin the swirling motion and swirl plates 105 promote both swirling and agitation so as to assure complete mixing of the secondary air which cooperates with the large (6" to 8" diameter) size of the superheater to oxidize the unburned constituents thereby raising the temperature of the exhaust to between 600° C.-900° C. or more. This temperature is well above that required for virtually complete combustion of both unburned hydrocarbons (requiring about 600° C. for 50 m.s.) and CO (requiring about 700° C. for about 100-150 m.s.). By placing the steam coils 130 within it, the superheater 104 serves as a burner or furnace due to the injection of hot secondary air through air inlet line 146 causing the steam in the last coils 130 to reach a higher temperature than it would in an ordinary engine exhaust manifold thereby further improving Rankine engine efficiency in the engine expansion chamber 44 due to the higher temperatures and pressures achieved.

Thus, running at a speed of about 70-75 MPH with the exhaust gas in the superheater at a temperature of around 900° C.-1000° C. due to the additional heat provided by combustion of unburned fuel, steam at the throttle T at designed flow rates can be heated to over 500° C. (932° F.). It is apparent, therefore, that high steam temperatures and pressures necessary for efficient Rankine engine operation are readily obtained by means of the invention.

Recovering Momentum of Vehicle

Figure 12:
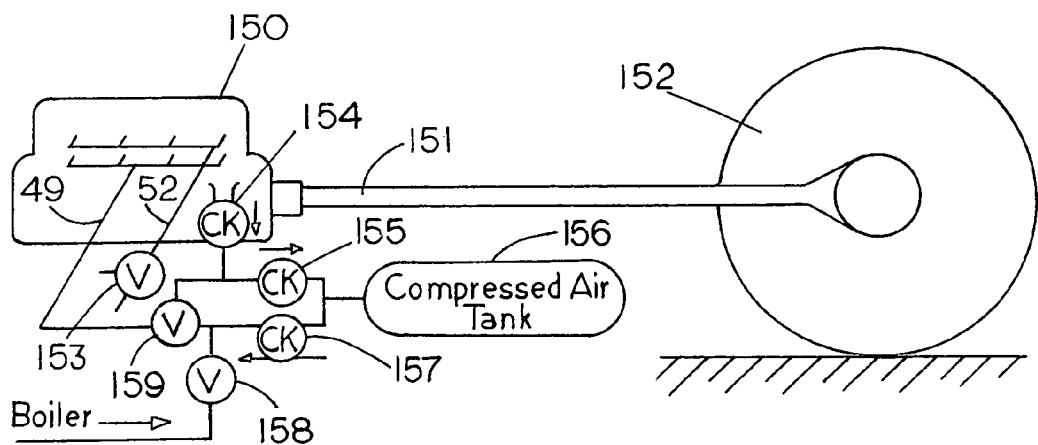
FIG. 12 is a schematic diagram showing the recovery of braking energy.

Refer now to FIG. 12 which illustrates the recuperation of kinetic energy during braking in accordance with the invention. A four cylinder automobile engine 150 of this invention e.g. FIGS. 9-9B is shown connected by a drive shaft 151 to a drive wheel 152 resting on the ground. The illustration shows a solenoid operated selector valve 153 in steam outlet line 52 and a solenoid valve 158 in the steam line leading to the steam generator. Also in line 49 is a solenoid selector valve 159 that is connectable via a first airline to a check valve 154 for receiving ambient air and a check valve 155 coupled to compressed air tank 156. The selector valve 159 can also connect line 49 via a second airline through check valve 157 to the compressed air tank 156. When the brakes are applied, the poppet valves 48 inside the engine 150 are held open by the engine management computer and selector valve 159 connects tank 156 to line 49 via valves 154 and 155 so that the changing volume of the steam expansion chambers 44 (FIGS. 1 and 2) forces air under pressure into tank 156 until the vehicle stops thereby storing kinetic energy in the form of compressed air. When the accelerator is depressed by the driver, the solenoid operated selector valve 159 connects tank 156 to line 49 through the check valve 157 while valve 48 operates normally as it does during steam operation thereby propelling the vehicle ahead due to the expansion within the steam chamber 44 of the compressed air that was stored during braking. Compressed air is vented through valve 153. In this way, the invention provides a vehicle that is propelled by a combination I.C. and steam power that was derived from thermal energy recovered from waste I.C. engine heat and momentum by selectively connecting a steam expansion chamber of the engine to a compressed air storage tank through valving that directs the flow of air from the expansion chamber either into a storage tank during braking of the vehicle or to move ahead, connects the steam expansion chamber to the air tank for directing compressed air from the air tank into the steam expansion chamber. With a cold engine and no steam pressure, the compressed air is able to provide a fast start even before raising steam as well as enhanced fuel efficiency during start up. It can therefore be seen that the invention provides an energy storage unit arranged such that the brake is operatively connected to the wheels for transferring momentum from the wheels 152 of the vehicle during braking (when engine power is not applied to the wheels) to the energy storage unit such as the compressed air tank 156 or any other energy storage device for later application to the wheels for moving the vehicle forward.

Stepped Piston Alternative

Figure 10:
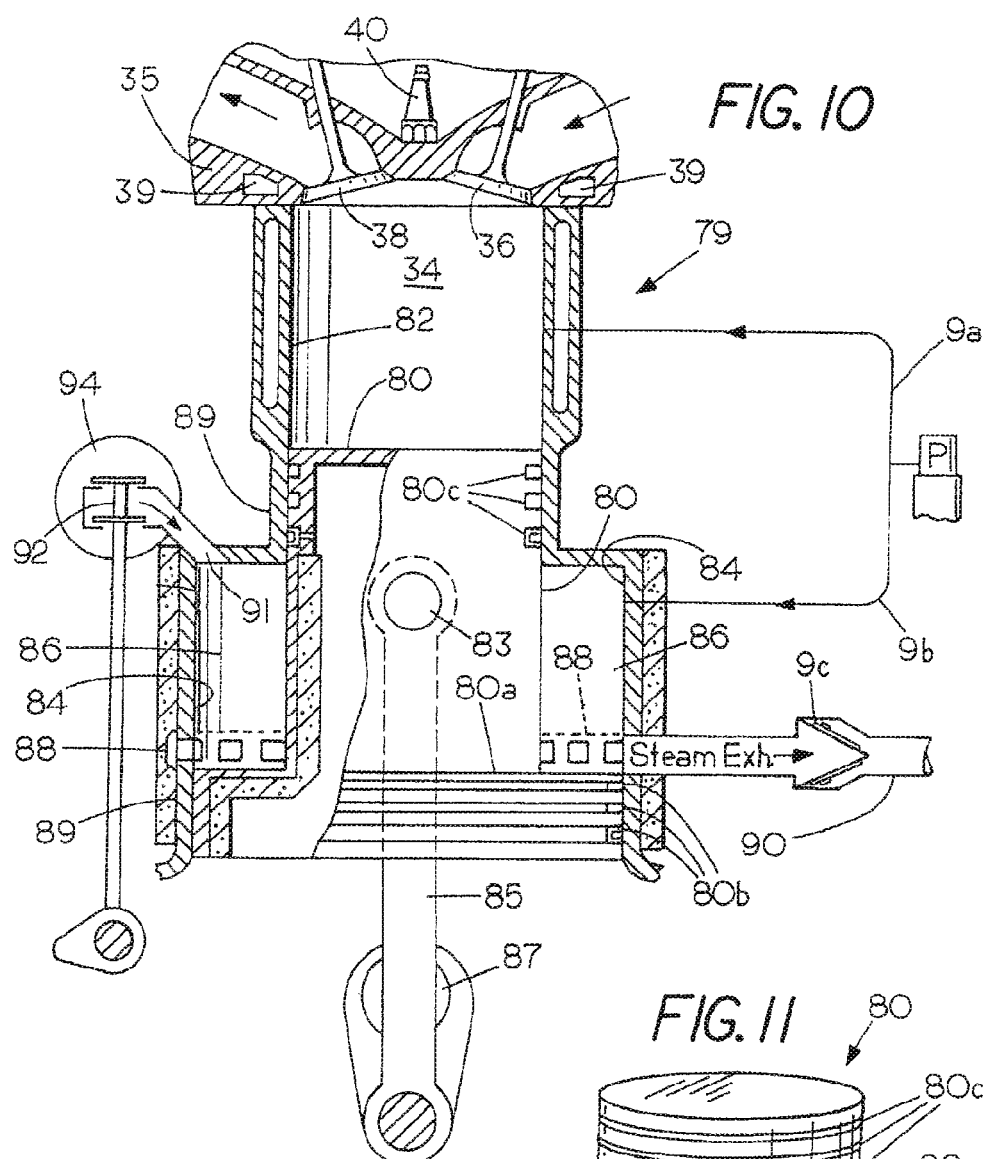
FIG. 10 is a vertical sectional view of a stepped piston engine in accordance with the invention.
Figure 11:
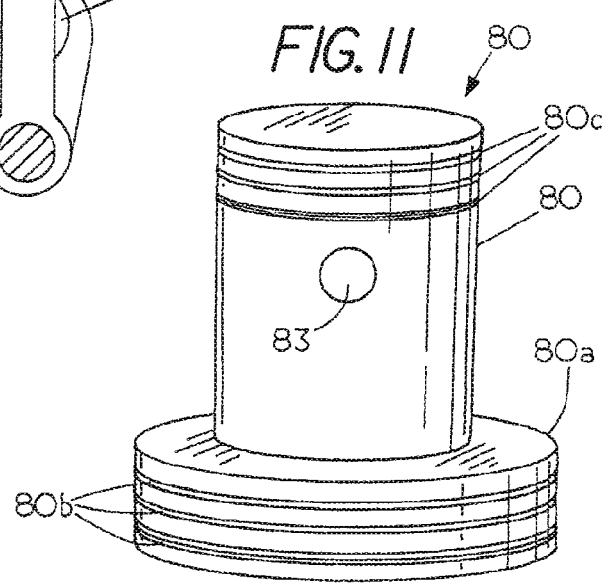
FIG. 11 is a perspective view of the piston of FIG. 10.

Refer now to FIGS. 10 and 11 which illustrate an alternative embodiment of the invention that employs a stepped piston 80. While this variation of the invention makes use of a different piston construction, it is also able to recover power from waste I.C. heat. The modified engine 79 shown in FIGS. 10 and 11 operates to achieve the same general objectives already outlined; better efficiency and gas mileage, but instead of having a steam expansion chamber inside the piston, the stepped piston 80 is provided with compression rings 80c at its upper end and an enlarged diameter 80a in the skirt area at its lower end that is provided with compression rings 80b. The combustion chamber 34 as well as the cylinder head 35 and its components are the same as already described above. The piston 80 fits sealingly for sliding motion in a cylinder 82 that has an enlarged cylindrical lower bore 84 to accommodate the enlarged diameter 80a, thus providing an annular steam expansion chamber 86 in the enlarged bore section 84. Both its combustion chamber 34 and the steam chamber 86 are adjacent the piston and chamber 34 is located adjacent the bottom portion of the piston 80. Lubricating oil is supplied under pressure through lines 9a and 9b to the inside wall of the cylinder. In operation, steam enters the steam expansion chamber 86 through an inlet valve 92 and port 91 from high-pressure valve chest 94. When the piston reaches bottom dead center and uncovers openings in the cylinder, steam is exhausted through a steam manifold 88 provided in the part of the engine cylinder block 89 that encircles the lower bore 84 from which it flows through a closed circuit like that described above including a condenser (not shown) through a check valve e.g. reed valve 9c via a low-pressure steam return line 90. The piston 80 located as shown between the combustion chamber 34 above the piston and the steam chamber 86 is connected to a crankshaft 87 by a wrist pin 83 and connecting rod 85. Waste combustion heat from the I.C. chamber 34 is recovered in a boiler and steam circuit as shown and described above in connection with FIGS. 9-9B to provide steam to chamber 86 for driving the piston 80 downwardly each revolution of the crankshaft 87. This is not a preferred embodiment in part because the large surface to volume ratio of the annular steam expansion chamber 86 will promote cooling resulting in reduced steam pressure. Flow restriction around the piston will also produce greater breathing losses, longer rings 80b result in increased mechanical losses and there is no heated surface adjacent steam outlet 88.

Description of FIGS. 18 to 25

Refer now to drawing FIGS. 18 through 25 wherein the same numerals refer to corresponding parts described above.

Figure 18:
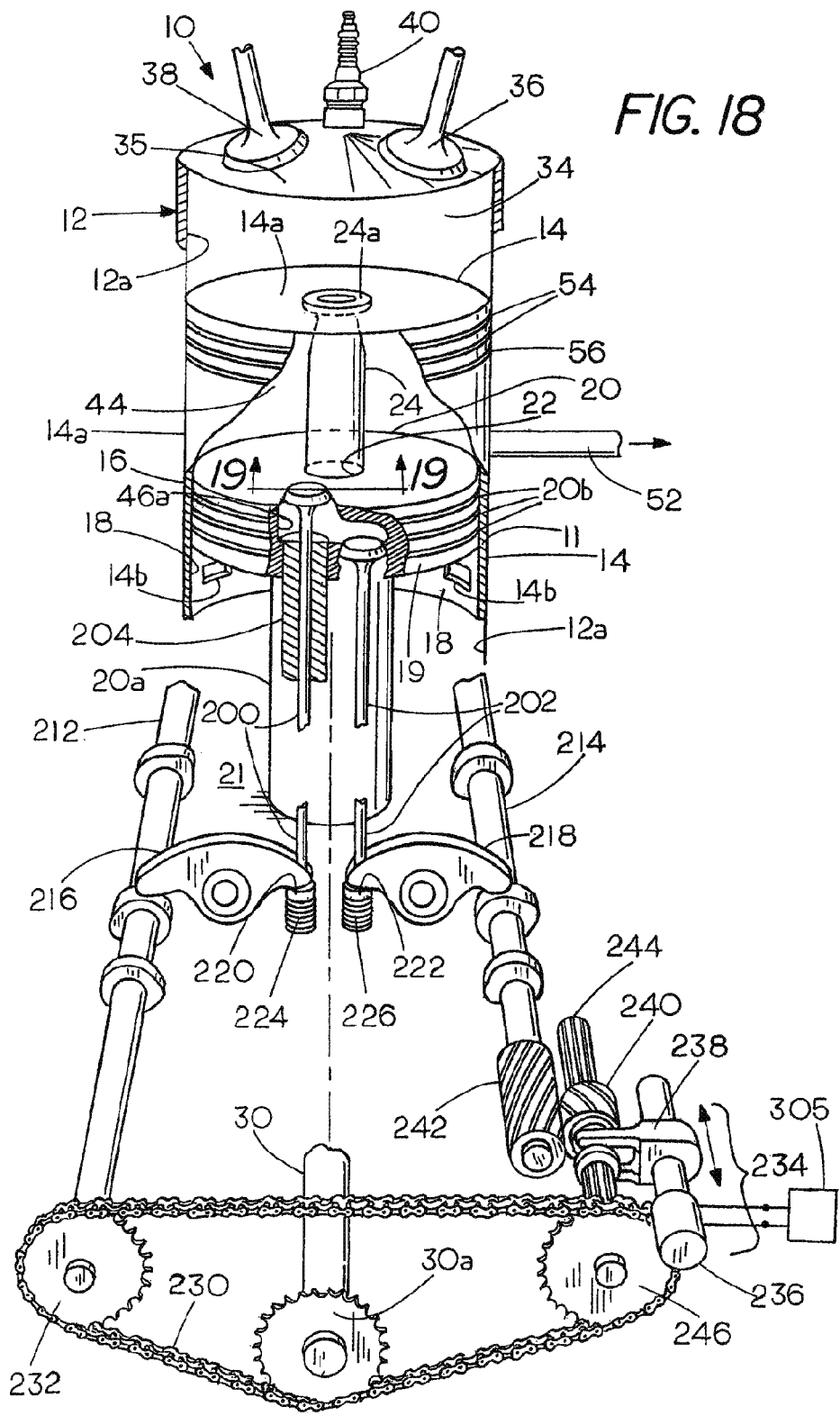
FIG. 18 is a diagrammatic perspective end view of one cylinder and the steam camshafts of an engine having two steam admission valves in series within a combustion piston according to the invention.

The engine 10 has one or more cylinders 12 each with a combustion piston 14 slideably mounted therein and sealed by piston compression rings 54, 56, a combustion chamber 34 outward of the piston 14 and a steam expansion chamber 44 in the cylinder 12 inward of the piston, i.e. between the piston and the cylinder cap 20. In general, the engine shown is constructed and operates as described above in connection with FIGS. 1-8. Differences in construction and operation will now be described. Mounted within the cylinder cap 20 to control the flow of steam from the steam chest 46 through the cap to the steam expansion chamber 44 above its upper surface are two series connected steam admission valves 200 and 202 which it will be noted are enclosed within the piston 14. The space between the crosshead guide 20a which supports cap 20 and the cylinder 12 defines the steam chest 46 as described above which contains high-pressure, high temperature steam at substantially throttle pressure that is admitted to the steam expansion chamber 44 below the piston 14 when both of the valves 200 and 202 are in the open position thereby driving the piston 14 outwardly. Valve control for regulating the supply of steam to the expansion chamber 44 during each expansion stroke is accomplished in this example by changing the phase of one of valves 200 or 202 as will be described more fully below. Valve 200 is ported through the cylinder cap 20 about midway between the piston rod 24 and the cylinder 12 (FIG. 18). During operation, the skirt of the piston 14 reciprocates as already described in the annular space 11 (FIG. 20) between the cylinder wall 12 and the cap 20.

In the manner described in connection with FIGS. 1-8, a conventional internal combustion chamber 34 above the upper face 14a of the piston 14 is enclosed at the top of the cylinder by a cylinder head 35 which has an inlet valve 36, an exhaust valve 38, a steam jacket 12b, 39 (shown in FIGS. 1 and 2) for coolant circulation between the cylinder and the head with a spark plug 40 operating as a four stroke (Otto) cycle or two-stroke I.C. engine that burns gasoline or other fuel in the combustion chamber 34 all as described above. The internal combustion section of the engine can run as a spark or compression ignition engine or combination of both wherein spark ignition is used for starting the latter. The combustion chamber 34 is cooled by a coolant circulated through the cooling jacket 12b (FIGS. 1 and 2) and then through 39 (FIG. 1).

Within the wall of the cylinder 12 and extending around it nearly in alignment but slightly above the top of cap 20 is the steam exhaust manifold 51 (FIG. 19) which communicates with the interior of the cylinder 12 through circumferentially spaced steam exhaust ports 50 as described in more detail concerning FIGS. 1 and 2. It can be seen in FIG. 19 that the steam inlet valves 200 and 202 and steam exhaust ports 50 are located in approximate lateral alignment but the exhaust ports are at a slightly higher elevation outward of the cap 20. It is also important to notice that by exhausting through the cylinder wall 12, the invention makes it possible to keep low-pressure exhaust steam away from the heated area below cap 20 where it could reduce the enthalpy of steam in the steam chest and in the incoming steam. The steam cylinder head or cap 20 has a peripheral collar 19 that is slideably and sealingly engaged with the inside wall of the piston. The steam exhaust valve also includes one or more ports 14b in the skirt of the piston 14 that are each spaced from the free lower edge of the piston by a skirt portion 18 (FIG. 19) which is large enough to overlap the collar 19 of the cylinder cap and maintain a seal when the piston is at the top center position shown in FIG. 1 as well as in application Ser. No. 12/075,042 filed Mar. 7, 2008, now U.S. Pat. No. 7,997,080 which is incorporated herein by reference.

Figure 19:
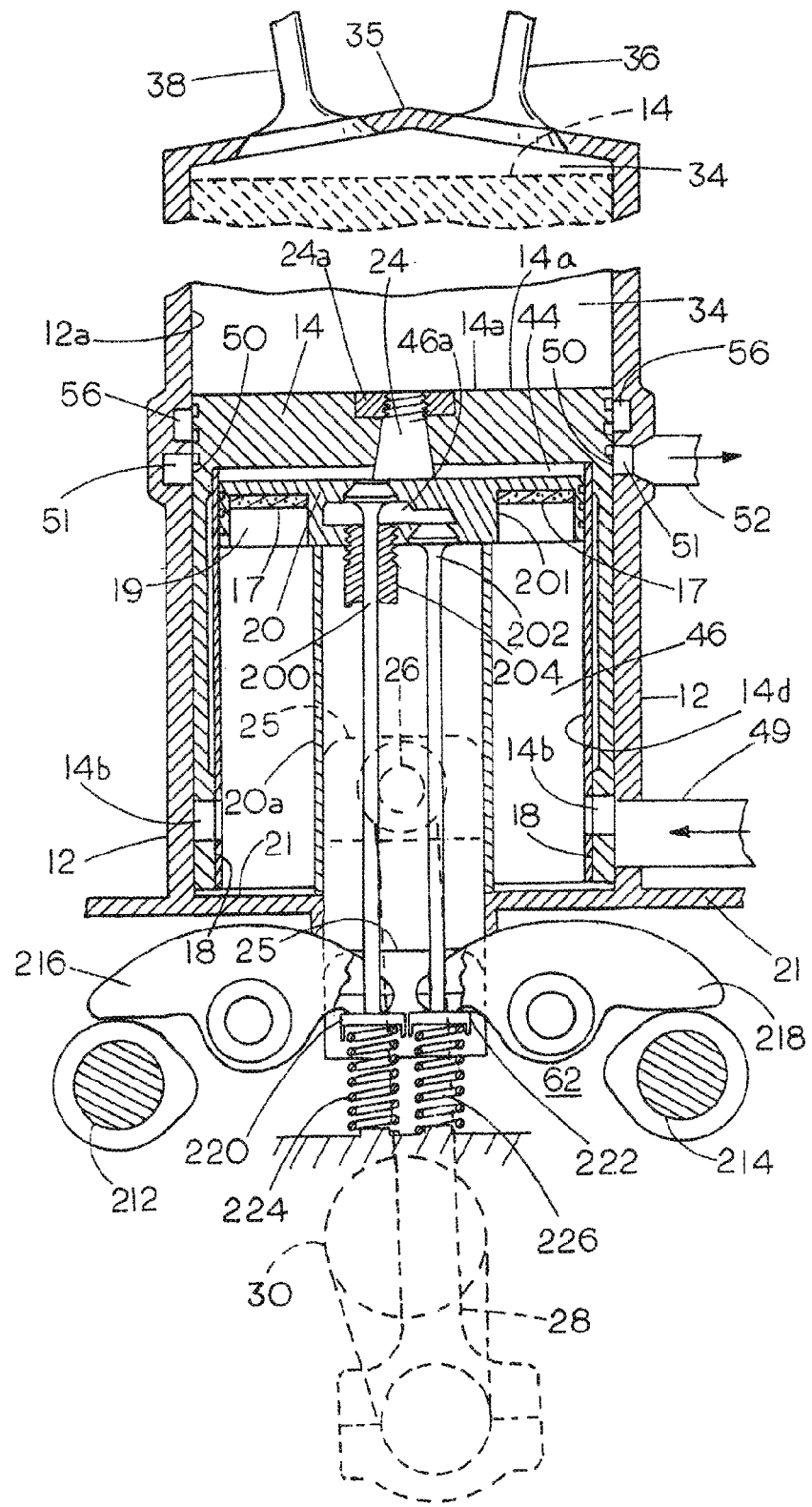
FIG. 19 is a diagrammatic vertical sectional view on line 19-19 of FIG. 18 to show the steam camshafts and crankshaft.

As in FIGS. 1-8, the cap 20 of FIGS. 18-23 serves as a lower steam cylinder head for the steam expansion chamber 44, seals the chamber, and in this embodiment provides support within piston 14 for both of the two series related steam inlet valves 200 and 202 as well as establishing the clearance volume of steam chamber 44 which is purposely kept small to insure efficient operation (see FIGS. 2 and 19).

In one form of the invention, the entire lower end of the steam expansion chamber 44 is steam jacketed including the steam inlet valves 200 and 202 and the top surface of the cap 20 which are therefore kept close to the elevated temperature of the steam chest 46 e.g. @ 850° F. thereby preventing loss of power due to steam condensation on those parts within chamber 44. It will be noted that the steam exhaust ports 50 unlike uniflow steam exhaust ports of a conventional uniflow steam engine are in this case located on the cylinder wall adjacent to an engine surface that can be heated, namely, the fixed cylinder cap 20, all of which except the center part close to piston rod 24, can be heated externally, if desired, throughout operation by the high pressure steam in the steam chest 46. Steam jacketing of the cylinder end cap 20 in accordance with the invention is beneficial in keeping the inner wall of the piston hot and can also be beneficial especially in small bore engines and under reduced loads with earlier cutoffs or at lower-range steam temperatures and pressures, e.g. during idling as well as start and stop driving when steam is wetter. Low-pressure steam is exhausted through line 52 as before. As illustrated, the exhaust valve will begin to open and will close fully when chamber 44 is about 89% fully expanded and is fully open at the top center position. Consequently, steam recompression will begin on the down stroke following steam exhaust as the piston 14 leaves the upper end of its stroke, i.e. the top dead center position.

The engine of FIGS. 18-22 produce a marked improvement in Rankine efficiency compared to a conventional counterflow steam engine in which steam enters and leaves through the same valve. When port 51 closes, steam is recompressed substantially throughout the remaining inward stroke of the piston bringing the pressure and temperature of residual steam up to admission values. In this way condensation of incoming steam by residual steam is avoided as well as in a steam-only uniflow engine. Efficiency, however, can be better than a uniflow steam engine because unlike a standard uniflow steam engine, where the piston surface adjacent the exhaust valve cannot be heated, here the entire adjacent cap 20 (FIGS. 1, 2, and 18-22) above steam chest 46 can be steam jacketed in any engine application that would benefit from it and thus heated continuously by the steam chest 46 so as to prevent chilling the incoming charge of steam from producing a loss in power. The steam exhaust valve, piston, cylinder and cap 20 are dimensioned, constructed and arranged to provide an effective zero clearance in chamber 44 and a gain in the mean Rankine cycle temperature as will be further described below.

Figure 20:
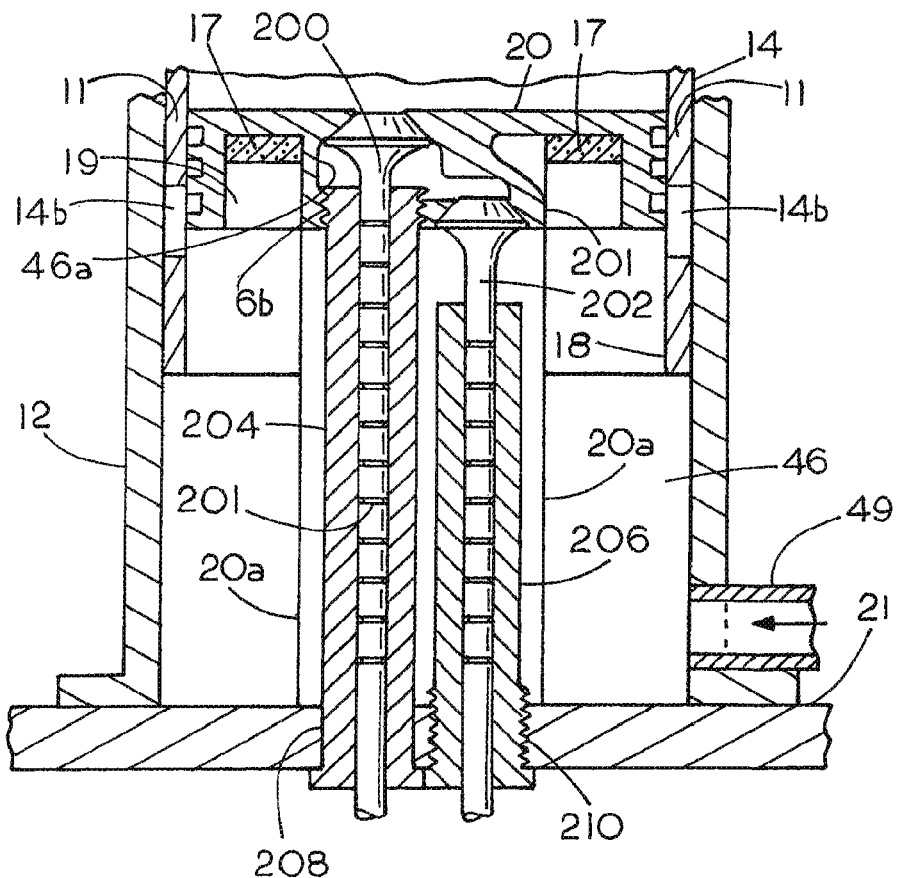
FIG. 20 is a partial vertical sectional view of the lower cylinder head or cap and cylinder similar to FIG. 19 on a slightly larger scale.

The mechanism for operating valves 200 and 202 will now be described with reference to FIGS. 18-20 and 22. These Figures show how steam admission poppet valves 200 and 202 are placed in series relationship and are enclosed within piston 14 at the upper and lower ends of inlet passage 46a that extends through the cylinder cap 20 with valve 200 at its upper end and valve 202 at its lower end so that steam is admitted from the steam chest 46 into the steam expansion chamber 44 only when both of the valves 200 and 202 are open. The stems of valves 200 and 202 extend inwardly through the steam chest 46 within valve guides 204 and 206 (FIG. 20) respectively, the former being threaded into the lower end of the inlet passage 46a by screw threads 6b (FIG. 20). Both guides 204, 206 are not shown in FIGS. 18 and 19 so that the valves can be clearly seen. The guides 204 and 206 are sealed at their lower ends within openings provided in the crankcase 21 as shown at 208 and 210 (FIG. 20). Guide 206 extends into the steam supply line at 49c (FIG. 23). The stems of valves 200 and 202 can be provided with shallow vertically spaced apart circular grooves 201 to serve as a labyrinth seal. It should be noted that the valves 200 and 202 have beveled valve face seals that are smaller in diameter at the outer end of each valve, providing distal seals, so that the valves open by being withdrawn inwardly, away from the steam expansion chamber 44 toward the crankshaft 30. Therefore, instead of acting as push rods, the stems act as traction rods to open the valves. By using series-related inwardly opening poppet valves 200 and 202, a relatively short cutoff is made possible with very little throttling while avoiding excessive G forces and cam stress at high RPM's. Consequently, the valve arrangement within the cap located inside of the combustion piston 14 as described makes it possible to accomplish a short steam cutoff in a high RPM combined cycle engine that has a piston speed compatible with the piston speed commonly experienced in an ordinary internal combustion car or truck engine that lacks thermal power recovery. At 3000 RPM each stroke lasts 0.01 second so that a 10% cutoff requires steam admission valves to open and close in 1/1000 second. However, by placing a pair of series-related inwardly retractable steam inlet valves in a cylinder cap that is slideably enclosed within the piston, it is possible to provide a variable steam cutoff even with short cutoff periods of 10% or less in a double-acting combustion/steam dual cycle engine in which steam is recompressed to admission pressure.

Operation of the valves 200 and 202 is accomplished by camshafts 212 and 214 through the action of centrally pivoted valve rockers 216 and 218 which open the valves by retracting them, i.e. moving them proximally (away from the steam expansion chamber 44) so that during operation steam enters the steam expansion chamber 44 from the steam chest 46 which is at a throttle pressure of say 1,000 p.s.i. Thus, steam is admitted when valves 200 and 202 are withdrawn responsive to a downward movement of the central ends of the rockers 216 and 218 against spring retainers 220 and 222 connected to the stems or traction rods of valves 200 and 202 which are normally held in the closed position by steam pressure and compression springs 224 and 226. The distal face seals of valves 200 and 202 can also permit the valves to open for relieving excess pressure whenever steam in chamber 44 is recompressed enough to exceed the closing force on valves 200 and 202 caused by steam pressure within steam chest 46 plus the spring force. As described below and shown in FIG. 24, an auxiliary clearance volume chamber 352 similar to that in FIG. 2 is provided in the cylinder cap 20. The pressure balancing ability of valves 200, 202 in cooperation with the auxiliary clearance volume chamber 352 prevent excessive recompression counter-torque on the crankshaft during starting and idling. It will also be noticed that the steam inlet valves 200 and 202 are easily moved by the camshafts 212, 214 due to the tendency for recompression pressure from above to open them, thus helping to balance the closing pressure from the steam chest 46. The steam admission valves 200 and 202 can therefore be opened with a force in the same range as that in a conventional internal combustion engine even when steam exerts a closing force of 500 lbs. or more on the valves.

The control of one or more steam inlet valves in accordance with the invention is used to continuously regulate the charge of steam admitted into the clearance volume at the beginning of each power stroke. While engine valve timing (the angle from the bottom center position of the crankshaft to the point at which the steam inlet valve opens or closes) and valve lift can be varied in any of several known ways in the present invention, whatever method is used should provide a regulated change in the mass of steam admitted. Therefore, the terms "valve control" or "valve cutoff" are used broadly herein to include valve phase shifting, valve lift changing, as well as changing the valve timing either separately or together for regulating the mass of steam that is admitted each cycle of operation.

Valve control for regulation the mass of steam admitted each stroke by means of valve phase angle control in place of a three-dimensional cam 64 (FIG. 2) will now be described with reference to FIGS. 18-23. The left camshaft 212 runs at crankshaft speed through its connection by drive chain 230 and a cooperating sprocket 30a at one end of the crankshaft 30 and an equal size sprocket 232 at the end of camshaft 212. The right camshaft 214 is also driven via a sprocket 246 and a shaft 244 rotating at crankshaft speed, in this case through a variable valve timer, specifically, a phase shift control 234 or other suitable valve timing device, variator or phaser of known construction for regulating the mass of steam admitted during each outward stroke of the piston. While two series related valves are preferred, the control 234 can be connected to a single valve in place of two valves 200 and 202 arranged to control the quantity of steam admitted each stroke. In FIG. 18 an electric servomotor 236 or other actuator is connected for shifting a positioning fork 238 parallel to camshaft 214 any selected distance so as to slide a helical gear 240 axially of a cooperating helical gear 242 at the end of camshaft 214 which is engaged with the gear 240. It will be seen that the left end of the positioning fork 238 extends into a circumferential groove in a boss at one end of gear 240 so that the helical gear 240 can rotate freely as the positioning fork 238 slides the gear 240 during operation to any selected position from one end of helical gear 242 to the other. It will also be seen that the gear 240 is supported for sliding movement on the axially splined shaft 244 which is driven at crankshaft speed by the chain 230 via the sprocket 246 so that gear 242 turns slightly relative to gear 240 as gear 240 moves axially thereby operating valve 202 earlier or later in the cycle. The electronic engine management computer or controller 305 (FIGS. 14, 18, and 25) is wired to control the operation of servomotor 236 to regulate the position of gear 240 and thereby provide the optimum steam charge, i.e. cutoff so as to achieve the lowest specific fuel consumption as previously described in connection with FIGS. 1-17. The electronic motor controller 305 itself is described in more detail hereinabove. The I.C. valves 36 and 38 can be operated by an overhead camshaft (not shown) or in a lower cost engine, they can be operated from steam camshaft 212 running at half crankshaft speed by providing each steam cam on camshaft 212 with two similar steam lobes 180° apart. The timing of valve 36 can also be coordinated with valve 202 by an I.C. pushrod from camshaft 214 to a valve rocker (not shown) for valve 36.

Figure 21:
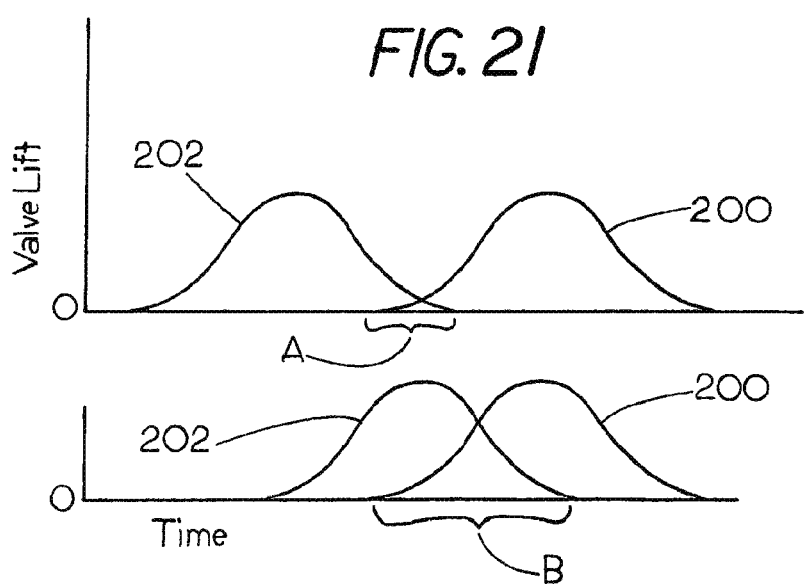
FIG. 21 is a diagram showing the valve opening sequences of a pair of series connected steam admission valves.

Refer now to the graphs shown in FIG. 21 which illustrate valve lift vs. time to depict the opening and closing of valves 200 and 202. During operation, when the electronic engine management controller 305 signals the servomotor 236 to shift the gear 240 a selected distance in a direction that spaces the opening of valves 200 and 202 further apart, there is an incremental rotation of shaft 214 due to the axial movement of gear 240 causing the phase of shaft 214 to be shifted, thereby altering the overlap of the valves so as to provide a short steam cutoff A as seen in the upper graph. Delaying the opening of the valve 202 as shown in the lower graph will provide a longer steam cutoff B by spacing the opening and closing of valves 200 and 202 closer together. In this way, by advancing or retarding the opening and closing of valve 202, a continuous infinitely variable steam cutoff is provided to control the charge of steam supplied to each cylinder for optimizing thermal power recovery and specific fuel consumption of the combined cycle engine 10 throughout operation.

During operation, the valves 200 and 202 are normally held shut by the operating steam pressure acting on the lower faces of the valves plus the spring force. However, it is desirable to have the recompression pressure in chamber 44 developed by the downward movement of the piston be the same as the operating pressure even when the steam operating pressure is varied by changing the throttle setting. The maximum operating pressure, i.e. the generator or boiler pressure of the power plant can be selected first, for example, 1000 p.s.i. The clearance volume in the chamber 44 is then set so that the recompression pressure that results when the piston descends equals the pre-selected operating pressure of the steam generator, namely, 1000 p.s.i. However, when the throttle pressure is reduced below 1000 p.s.i., power is wasted during the recompression stroke. Consequently it is desirable to keep the recompression pressure in the clearance space equal to whatever the throttle pressure happens to be.

To accomplish this, in case excessive recompression occurs in the clearance volume of chamber 44, a resulting drop in efficiency can be prevented by an optional pressure-regulating valve 360 (FIG. 24) which will now be described. Threaded into opposite ends of a passageway 361 that extends through the cylinder cap 20 from chamber 44 to chamber 46 is an annular valve seat 362, and an annular spring retainer 363 enclosing a relatively light spring 364 with enough force to reliably seat a frustoconical valve element 365 onto the seat 362. The clearance volume between the cap 20 and the piston 14 at bottom dead center is determined so as to recompress residual steam up to the maximum operating pressure, i.e. the boiler pressure, e.g. 1000 p.s.i. However, throughout operation, whenever the throttle pressure is less than 1000 p.s.i., the valve 360 will open near the end of the recompression stroke equalizing the pressure by allowing excess steam to pass out of the clearance space thereby preventing power losses due to work performed in recompressing residual steam above the throttle pressure. The valves 200 and 202 will then be opened only by the valve retractors and not by a pressure differential across them.

During operation, the effective clearance volume within the steam expansion chamber 44 can also be varied as explained above by the auxiliary clearance volume chamber 45 (FIG. 2) or 352 (FIG. 24) and if valve 360 is used, the maximum recompression pressure that can be developed will also be controlled by the regulating valve 360 so that when the piston reaches the end of its inward stroke, the recompression pressure will be equal or almost equal to the throttle pressure in chamber 46 whatever its value. Thus, at the opening of the admission valves 200 and 202 at or near BDC, no steam flows into chamber 44 of the cylinder because the cylinder is already filled. Consequently, no steam mass is consumed just to fill the clearance volume. The result is an effective zero clearance. When steam does flow into the cylinder, its mass is totally consumed by admission and expansion work. Steam is therefore more efficiently utilized, thus improving efficiency of the engine. Also, as recompression occurs, the temperature of the recompressed steam will rise up to or above the admission supply temperature. The recompressed steam mixes with the supply steam admitted through valves 200, 202 resulting in a steam temperature at cutoff that is most preferably greater than the supply temperature thereby producing a gain in the mean cycle temperature and when the mean cycle temperature is elevated, the efficiency of the engine is enhanced. These two events of course occur at the expense of the work of recompression. However, thermodynamic analysis indicates that there is a net improvement in efficiency due to an effective zero clearance and an increase in the mean cycle temperature which produces an increase in output that is greater than the fraction of the recompression work that cannot be recovered during the expansion stroke. It can therefore be seen that the present invention is able to provide a dual cycle internal combustion steam engine having an effective zero clearance in the steam expansion chamber 44 as well as the capacity for achieving a mean cycle temperature gain thereby assuring a higher level of Rankine efficiency. It should be noted that if valve 360 is used, it will open whenever the pressures in chamber 44 is slightly above that in chamber 46 while in the case of valves 200, 202, the opening force will be significantly greater than the net closing force whenever the throttle is partly closed.

Figure 24:
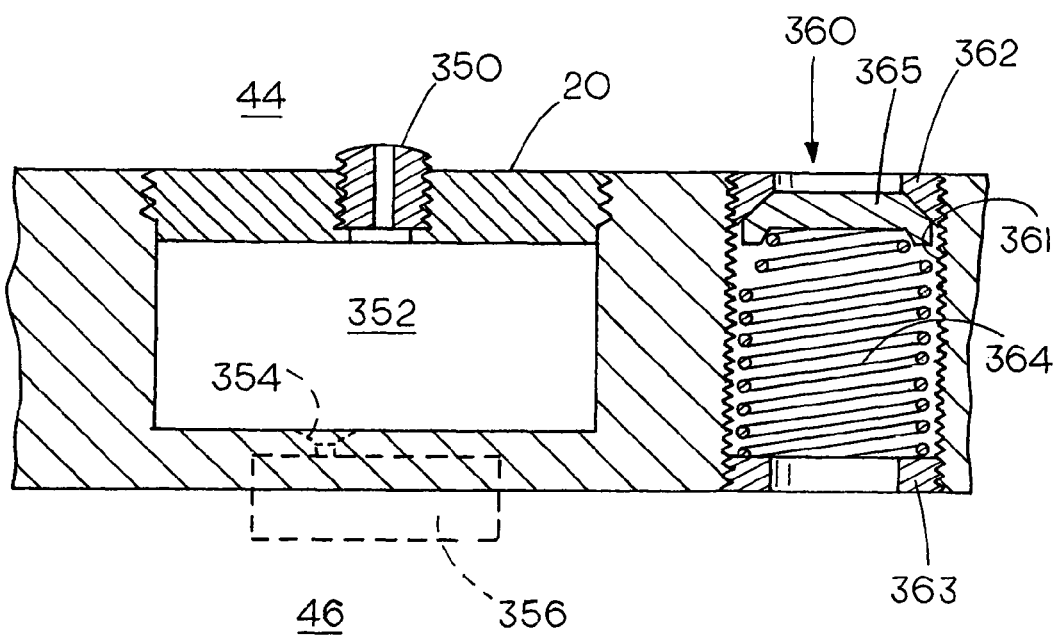
FIG. 24 is a diagrammatic vertical cross section of a portion of the cylinder cap showing an auxiliary clearance volume chamber and a pressure regulating valve.

The retractable series valve arrangement of the valves 200 and 202 in the cap 20 which is in turn enclosed within of the internal combustion piston 14 brings steam valve acceleration and operating rates to reasonable levels even if a short cutoff period is required as optimum efficiency is achieved while at the same time the closing force on the valves is balanced in large part through the recompression pressure developed as the piston descends acting in cooperation with the auxiliary clearance chamber 352 (FIG. 24). The series-related valves 201 and 202 are, moreover, effective in overcoming the valve acceleration and stress problems within the cutoff range (5% to 12%) that is of interest because it will guarantee a steam use rate which is commensurate with the water evaporation rate of the steam generator.

EXAMPLE

Calculation of Power Recovered

A one-cylinder 564 cc (34.4 cubic inches), 4-cycle internal combustion engine (bore 96 mm×stroke 78 mm) producing 13.5 horsepower (572.6 Btu/min) at 3000 rpm and exhibiting a brake efficiency of 21% will require an energy input rate of 2526.7 Btu/min and will reject 2154.1 Btu/min to the steam generator 104. For a boiler efficiency of 70%, which is merely average for modern monotube steam generators, 1507.8 Btu/min will be transferred to heat the feed water. The sustained evaporation is the ratio of the waste heat recovered to the enthalpy change $\Delta h$ as the feed water (or steam) passes through the steam generator. At 800 psia and 800° F. with saturated feed water at 14.7 psia and 212° F., the enthalpy change is 1218.5 Btu/lb (1398.6-180.07). The resulting sustained evaporation rate for supply steam $m_s$ is then 1.24 lb/min.:

$$m_s = \frac{\text{waste heat recovered}}{\Delta h}$$
$$= \frac{1507.8 \text{ Btu/min}}{1218.5 \text{ Btu/lb}}$$
$$= 1.24 \text{ lb/min}$$

Rankine cycle analysis based on the internal energy changes of non-flow process within a 24 cubic inch (399 cc) displacement high compression uniflow steam expansion chamber 44 (e.g. FIGS. 18-25) with a 7% cutoff will yield a brake efficiency of 18.9% with supply conditions at 800 psia and 800° F. This level of performance is consistent with an engine friction torque of 0.10 foot pounds per cubic inch displacement and pump work necessary to raise the feed water pressure from 14.7 psia to an operating pressure of 800 psia. Steam consumption under these constraints is 1.11 lb/min. This is consistent with the evaporation rate of 1.24 lb/min. Power delivered by steam=0.189×1507.8 Btu/min/42.41 Btu/min/hp=6.72 horsepower. The combined performance of both internal combustion and steam engine therefore represents a 49% increase over the 13.5 horsepower internal combustion engine acting alone. Regenerator use and heat recovery from unburned fuel provides a still greater increase. At a 75% boiler efficiency consistent with monotube steam generators tested in cars, the brake Rankine efficiency would be 20.4% producing 7.25 HP from steam which is a 54% increase in power under the same conditions. When used in a hybrid electric installation, even greater economies are obtained.

Consolidated Valves

Figure 22:
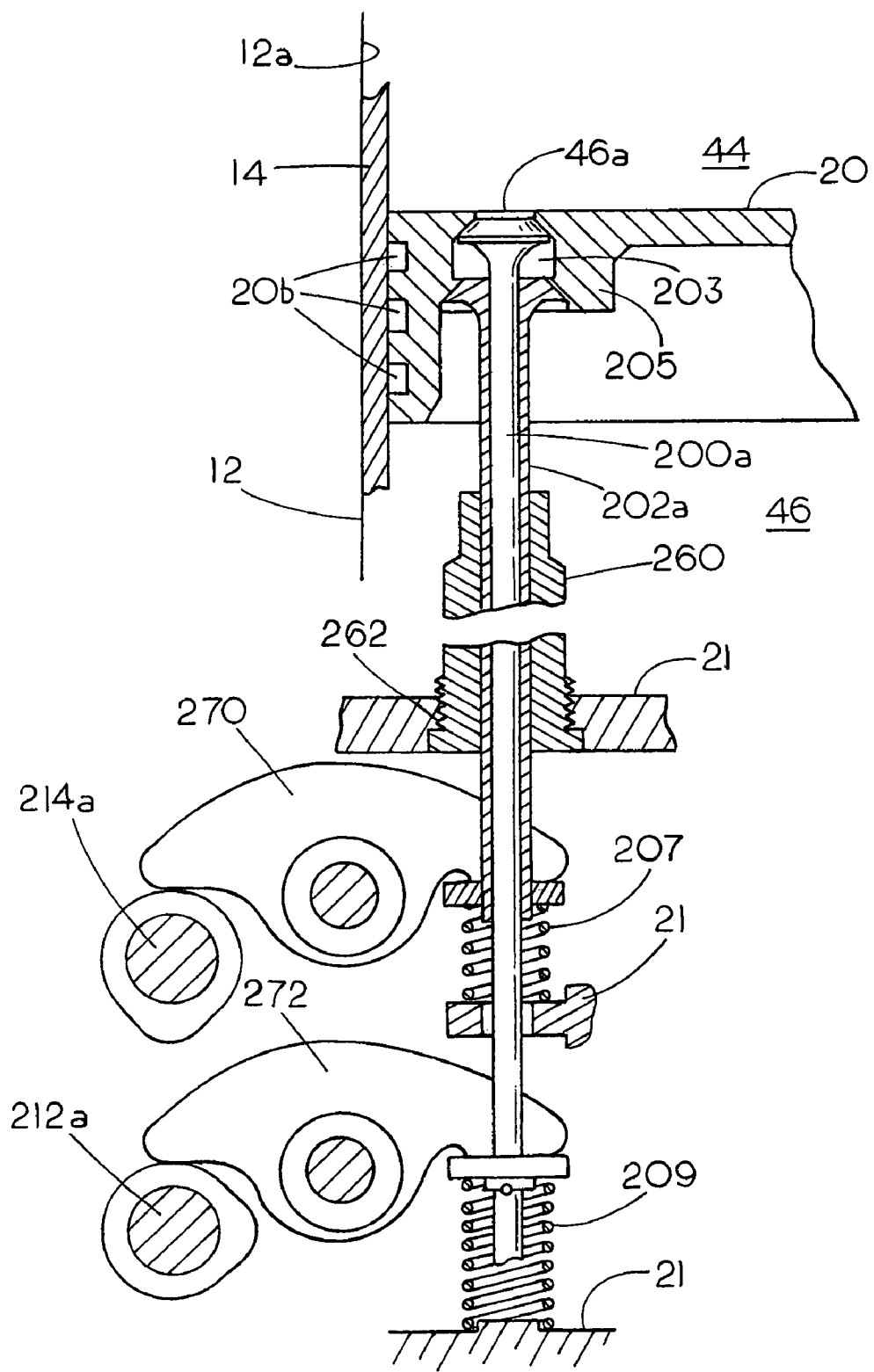
FIG. 22 is a diagrammatic end elevational view partly in section that shows optional concentric steam admission valves according to the invention.
Figure 23:
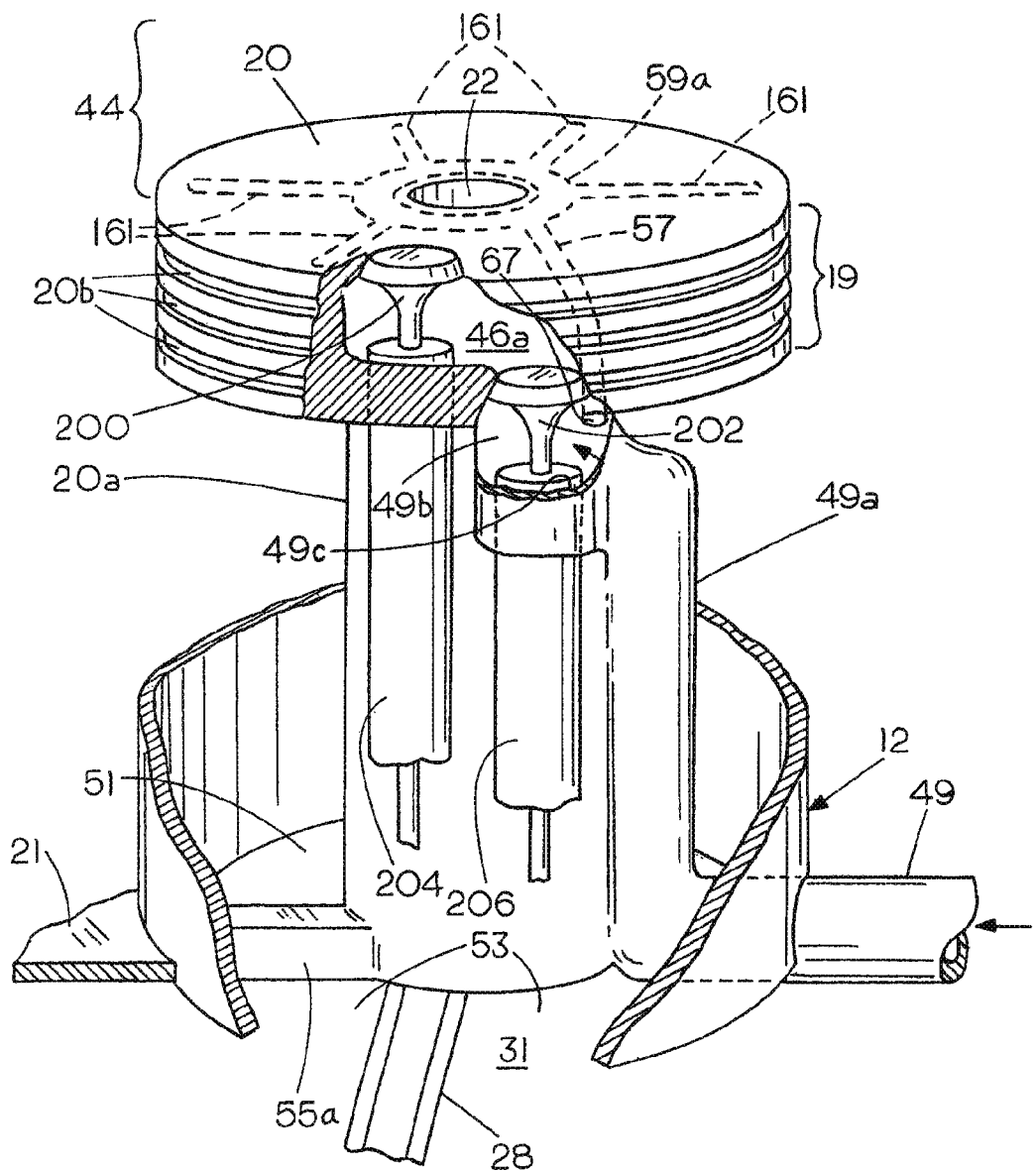
FIG. 23 is a diagrammatic perspective view partly in section broken away to show the cylinder cap, steam admission valves and the crosshead guide with a pipe to supply steam directly to the admission valves.

Refer now to FIG. 22 which illustrates a modified form of the invention having valves that operate in a manner similar to valves 200 and 202 except that in this example a pair of admission poppet valves 200a and 202a are concentrically arranged so that the valve 200a slides within a central bore in a tubular poppet valve 202a. The lower valve 202a is mounted to slide within a valve guide 260 which is secured at 262 to the crankcase 21 to provide a steam-proof seal. Valves 200a and 202a are normally held in the closed position within the cap 20 inside of the combustion piston by compression springs 207 and 209. In this case, the valves 200a and 202a are operated by vertically spaced rockers 270 and 272 respectively, which engage vertically spaced apart cams of camshafts 212a and 214a, the timing of which is controlled in the same manner as described in connection with FIGS. 18-21. Thus, the phase of the camshaft 214a is advanced or retarded with respect to camshaft 212a to thereby regulate the cutoff of steam through the sequential operation of valves 200a and 202a which together permit the admission of steam through an intervalve passage 203 into the steam expansion chamber 44 when both admission valves 200a and 202a are open. This enables the steam cutoff to be varied throughout operation as determined by the electronic engine management controller 305 through variable cam positioning, namely by changing the phase angle of shaft 214a relative to shaft 212a as described in connection with FIGS. 18-21. The concentric valves provide the advantage of minimizing the size of passage 203 within casing 205 thereby assuring better control of the volume of steam admitted, especially at a short cutoff as well as a straight passage 302 and enlarged steam chest volume since only one valve guide is needed.

Engine Installations and Steam Production

The engine 10 can be installed and used in various ways. For example, the engine can be connected directly to the wheels of a vehicle as described above (see FIG. 12). When mechanically connected to the wheels to power the vehicle, the engine will operate at varying speeds and loads that result from continuously changing driving conditions. In such an installation, the invention provides operational flexibility in spite of rapidly changing driving conditions as well as an ability to function at I.C. engine speeds, and a way of matching the engine displacement with the changes in steam generator output as described hereinabove and in the prior related application Ser. No. 12/075,042 (Publication No. US 2008/0216480 A1), published Sep. 11, 2008 which is incorporated herein by reference, now U.S. Pat. No. 7,997,080. However, instead of powering the wheels, the engine can also be used in a hybrid vehicle as a constant RPM, reduced size, battery charging module to increase the range of a vehicle, in this application, the engine 10 is operated at an optimum fixed RPM and load while connected to an electric generator and is run for extended periods of time to recharge a battery and/or an ultracapacitor, i.e. as a recharging module and/or to power an electric drive motor that is coupled to the wheels of the vehicle. This enables the engine to operate as efficiently as possible at a higher speed for extended periods with the dimensions of steam engine components and their operating parameters chosen to provide the lowest specific fuel consumption for the particular internal combustion assembly components used in any given engine.

Figure 25:
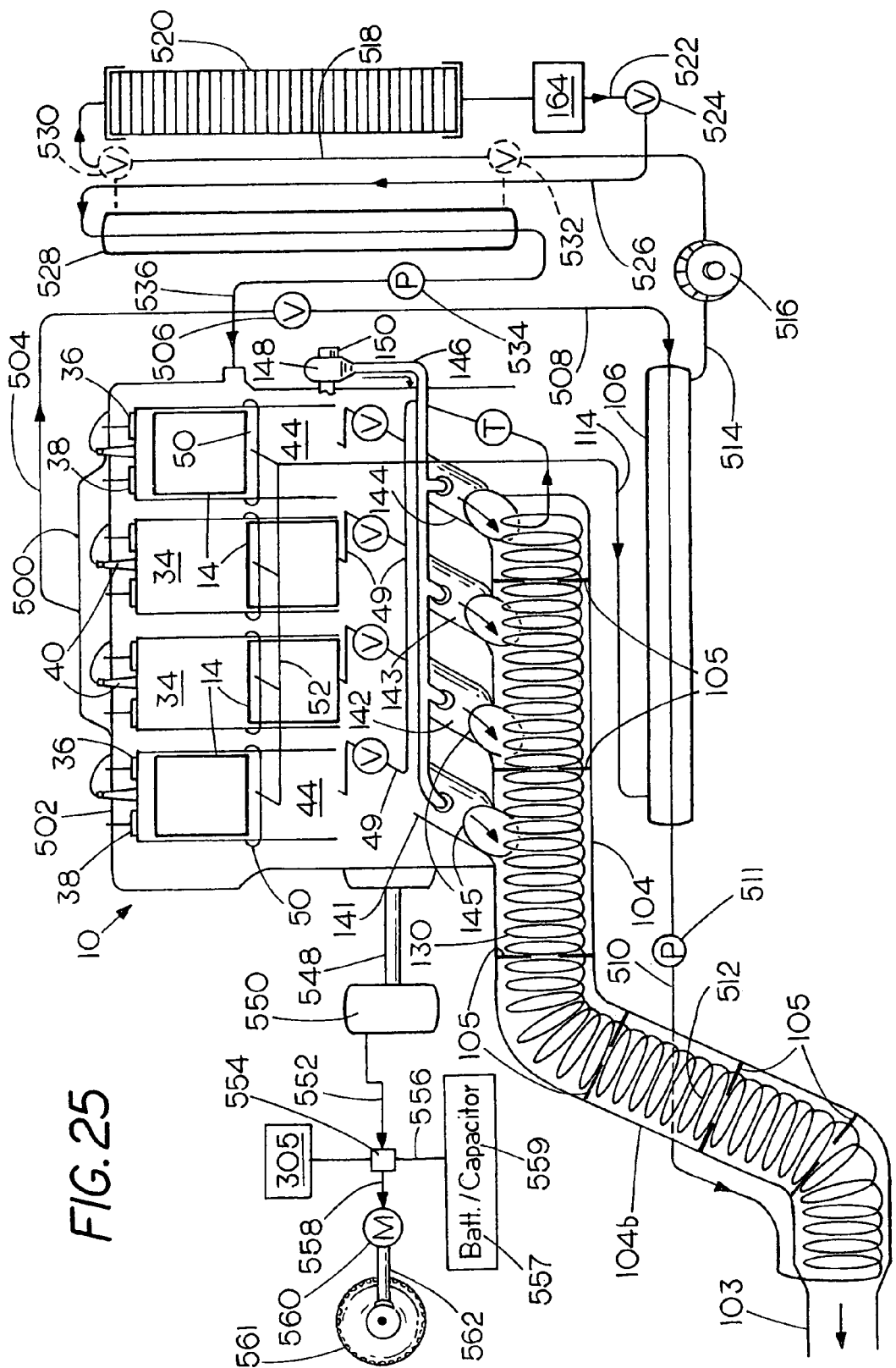
FIG. 25 is a schematic diagram of one form of engine installation assembly and engine control.

A power plant installation especially useful as a battery charging module to extend the driving range of a hybrid I.C./electric vehicle but which could alternatively be connected mechanically to power the drive wheels is shown in FIG. 25 wherein the same numerals designate corresponding parts described above and in application Ser. No. 12/075,042 filed Mar. 7, 2008. For simplicity and clarity of illustration, the complete engine coolant circuit within the engine and the steam generator 100 of application Ser. No. 12/075,042 has not been shown in FIG. 25 but both can, if desired, be constructed as previously described. In FIG. 25 it will be seen that the engine 10 is connected mechanically by shaft 548 to an electric generator 550 which is wired at 552 to a power supply 554 that provides electric current to storage batteries 557 and/or ultracapacitors 559 through conductor 556 under the control of the electronic central engine management computer 305. Current from the power supply 554 can also be provided through conductor 558 to an electric motor generator 560 which is connected by shaft 562 to the drive wheels 561 of a vehicle such as an automobile, truck, locomotive, or propeller of an aircraft. Thus, during operation, the engine 10 is run at an optimum speed and load which is typically at a fixed RPM selected for recharging the ultracapacitor 559 and battery 557 when required and/or to provide electric power to the motor 560 which can be supplemented by power from the ultracapacitor 559 and/or battery 557 whenever additional power is needed. When the battery is charged above a set level, the engine 10 can be turned off by the motor controller 305 and the electric motor 560 then operated by the battery and/or ultracapacitor either separately or together. In such an installation, the vehicle is run initially on current from the battery 557 and/or ultracapacitor 559 while the engine 10 is used primarily as a back-up battery recharging device to increase the range of the vehicle.

During braking, electric motor 560 acts as a generator for recovering momentum by charging the battery and/or capacitor under the control of the CEM computer 305 for later moving the vehicle ahead.

In place of an ordinary liquid coolant system used in a conventional I.C. car engine, heat can optionally be removed from the combustion chambers of the engine 10 by boiling the coolant, if desired, i.e. by evaporative cooling to produce steam in the cooling jacket 12b and 39. This can be accomplished, for example, by spray cooling each cylinder to generate steam. Evaporative spray cooling can be carried out as disclosed by D. A. Arais, et. al., *SAE Technical Paper,* 2006-01-1605 in which the cylinder is cooled by a spray of liquid coolant from several small parallel vertical pipes (not shown) within the jacket 12b surrounding the cylinder to produce steam. Compared to a conventional water-cooled engine, evaporative cooling absorbs 970 additional Btus of heat per pound of water evaporated in the production of steam; the heat of vaporization. The resulting steam is able to accomplish much more efficient heating when the coolant is fed to a steam generator as steam rather than as hot water. This is explained by the better match between the temperatures of the energy sources; steam from the I.C. engine block (in place of hot water) and the engine exhaust gas used to power the steam generator. Evaporative cooling is carried out within the engine cooling jacket in a manner that maintains nucleate boiling so as to avoid exceeding a critical heat flux which can result in the formation of an insulating vapor blanket layer within the liquid at the hot metal surface allowing the temperature of the metal to jump suddenly as runaway heating takes place with potentially harmful results such as engine knock (detonation). Spray cooling is one way of avoiding hot spots. Another way is to impart vibratory movement to the liquid by attaching an ultrasonic vibrator to the cooling jacket. Kwon, et. al., were able to substantially increase the critical heat flux using a 40 kHz ultrasonic vibrator (see *Experimental Study On CHF Enhancement In Pool Boiling Using Ultrasonic Field*, J. Ind. Eng. Chem., Vol. 11, No. 5 (2005 pg. 631-637). Evaporative cooling can also be carried out as described in U.S. Pat. Nos. 3,731,660; 4,565,162; and 7,421,783 or as described in Ap, et. al., *New Components Development for New Engine Cooling System* VTMS4, 1999, Paper C 543/047/99. See also SAE Paper by Chamfreau, et. al., No. 2001-01-1742.

Refer again to FIG. 25 which illustrates an example to show how the invention can be installed and used as a constant speed, high RPM battery recharging module. In this example of the invention, engine cooling and final steam production are integrated in series by circulating a single fluid in a closed loop to serve as an engine coolant as well as a working fluid in the engine. Thus, the fluid is heated first in the combustion chamber cooling jacket (12b and 39 FIG. 1) preferably to form steam by evaporative cooling as described above. The steam then flows to the generator/superheater 104b-104 where it is heated further by combustion exhaust gas to provide superheated steam under high pressure that is supplied through the throttle T to the steam expansion chambers 44 of the engine 10 below the pistons 14. By running the cooling chambers 39, 12b (FIG. 1) at a high enough temperature to evaporate the coolant within the cooling jacket itself, steam collects at a controlled pressure above atmospheric pressure in the chamber 500 just above the combustion chambers 34. In operation, the steam flows out through a steam duct 504 to a pressure regulator valve 506 which maintains a predetermined pressure within the engine 10. For example, at 25 psia, saturated steam produced in the engine will be at a temperature of 240° F. Once the steam has reached the predetermined pressure established by valve 506, it will then pass through supply line 508 to countercurrent flow heat exchanger or regenerator 106 where low-pressure steam exhausted from the steam expansion chambers of the engine 10 through line 52 to line 114 enters the heat exchanger 106, flowing in the opposite direction thereby transferring a part of its heat load to the low temperature steam formed in the engine cooling jacket 39, 12b (FIG. 1). Pressure in the steam generator and superheater 104 is maintained by a feed pump 511 in line 510. From the heat exchanger 106, the steam which has now been heated to a temperature approaching the temperature of exhausted steam, flows through pump 511 into the superheater 104 which has been extended by a pre-heater section 104b to a total length of about 6 feet or more and contains additional heater coils 130 that in the figures are depicted as a single spiral but which can consist of a total of 58 or more pancake coils 512, e.g. of ⅝" steel tubing connected end to end and spaced about 1¼ inches on centers. Each pancake coil 512 can be about 60 inches long to provide a total of about 290 feet of tubing (52 sq. ft. of heating surface) providing a 24 HP steam generator in which little power is lost due to backpressure. Superheated steam that is formed in the superheater 104 flows as described above through the throttle T, then through the high-pressure steam supply line 49 and valves V to the steam chest 46 or directly to valve 202 (see FIG. 23) then to the steam expansion chambers 44 to power the engine as described previously. The low-pressure exhaust steam from the heat exchanger 106 after having transferred its heat load to the steam from the engine cooling jacket is pumped from line 514 by a compressor 516 through line 518 to a condenser 520 which is maintained by the compressor 516 at an elevated pressure substantially above atmospheric pressure so as to achieve a high rate of cooling by the condenser 520 owing to a substantial temperature difference between the ambient air passing through the condenser and the pressurized steam entering the condenser. Condensed steam collects at the bottom of the condenser 520 where it drains into a storage tank 164. The pressurized condensate in the storage tank 164 flows through a line 522 to a pressure regulator valve 524 which maintains the high pressure in the condenser 520 and in storage tank 164. From valve 524, condensate flows at a relatively low pressure through a feedwater line 526 to a countercurrent flow heat exchanger 528 where it can be preheated under certain operating conditions by diverting the flow from line 518 by valves 530 and 532 through the heat exchanger 528 when steam in line 518 is at a significantly higher temperature than the feedwater entering through line 526. From the heat exchanger 528, the feedwater is pumped by a feedwater pump 534 through line 536 back to the engine cooling jacket 12*b* to complete a closed circuit where it is again evaporated to form steam within the cooling jacket 12*b* and 39 of the engine 10.

During operation, the I.C. exhaust gases passing through exhaust pipes 141-144 into the exhaust manifold 104-104*b* which functions as a superheater, pass out through exhaust pipe 103. As noted above, spent steam exhaust from engine 10 is carried by pipe 52 through line 114 to the regenerator 106, then to condenser 520 and through line 536 to the cooling jacket of engine 10. Coolant leaving the engine as steam through duct 504 picks up the residual heat from the exhausted steam in regenerator 106 before entering the generator/superheater 104-104*b*. Superheated steam from the superheater section 104 passes through the throttle T to the high-pressure steam line 49 into the engine 10 while the steam cutoff is regulated by engine controller 305 to maximize efficiency as described above and in application Ser. No. 12/075,042, now U.S. Pat. No. 7,997,080. In FIGS. 18-25 the steam charge cutoff is controlled as previously described by changing the phase angle of camshaft 214 to optimize the specific power output recovered from steam. One or more engine operating variables including the fuel consumption rate can be used as inputs to electronic computer 305 for controlling the operation of the throttle T and the cutoff servo 236 (FIG. 18) as previously described. Rankine cycle operation is most effectively optimized by regulating both steam cutoff and throttle control.

As noted above, operating conditions experienced by the engine vary greatly depending upon how the engine is used and applied to the load, whether connected to drive the wheels of a vehicle or run at a constant RPM for extended periods as in powering an electric generator that is used to charge a battery. In the second application, and particularly when accompanied by the use of an afterburner for consuming unburned exhaust constituents as shown in FIGS. 9A, 9B and 25, the engine 10 may produce relatively high temperature exhaust gas, e.g. at 700° C. to 900° C. for long periods of time. When run continuously in this manner, the temperature of the steam being supplied to the engine may reach a level sufficiently high that the cylinder cap 20 will become overheated, that is to say, if a high degree of superheat is provided over an extended period, it is possible to heat the upper surface of the cap 20 enough so that heat carried away in the steam exhausted from the cylinder outweighs the saving provided by heating the cap 20 to prevent the cap from chilling and thus reducing the enthalpy of each fresh charge of high-pressure steam. In such a case, where there is excessive heat loss from the cap, the cap can be provided with either no external heating or a controlled degree of external heating. One way this can be accomplished is through the use of a heat insulating layer inside the cap such as an optional porous mineral liner 17 (FIGS. 19 and 20) having relatively low thermal conductivity to insulate and thereby limit the heat flux from steam chest 46 to the upper surface of the cap 20 to a degree that optimizes heat transfer to chamber 44. Thus, according to this feature of the invention, the rate of heat flow from the steam chest 46 through the cap 20 is limited, i.e. controlled. It can be seen that the optional insulating layer 17 of FIGS. 19 and 20 reduces heat transfer through the cylinder cap 20 while the valve compartment 201 containing valves 200 and 202 is not covered by the optional insulating layer 17 and therefore remains at the temperature of the steam chest 46. The controlled heating rate can be determined by selecting the thickness and thermal properties of the insulating layer 17 to optimize the transfer of heat to the top of the cap 20 as judged by the power output or specific fuel consumption of the engine. Accordingly, it is an optional feature of the invention to provide a cylinder cap inside an internal combustion piston with either no external heating or controlled external heating of the cylinder cap 20. Thus, heat control is accomplished in this case by optionally providing a heat source, e.g. the steam at 46 in heat-conductive relationship with the cylinder cap through the heat transfer barrier, e.g. layer 17, between the cap and the heat source for reducing heat flow through the cylinder cap to the steam expansion chamber 44 to a level below that produced by steam jacketing the cylinder cap as in FIGS. 1-8. On the other hand, in applications when the operation of the engine 10 is typically intermittent as in a hybrid gas engine/electric vehicle such as the Toyota Prius™ car where the engine is mechanically connected to the drive wheels, heat flow to the cap 20 can be uncontrolled so as to maximize heating of the cap by high-pressure steam in the steam chest 46. However, if the engine 10 is connected instead only to drive an electric generator at a constant relatively high speed for recharging batteries, etc., as in the G.M. Volt™ car or any other application in which overheating of the cap could reduce steam efficiency, heating from a source of heat such as the steam chest 46 can be completely removed or reduced in any suitable way by controlling heat flow to the top of the cap 20 to an optimal level based on power output.

Refer now to FIG. 23 which shows the engine 10 constructed without the steam chest 46. Instead, steam from the superheater 104 flows through a feed pipe 49*a* directly to valve 202. In accordance with the optional feature of the invention shown in FIG. 23, the cap is either not heated externally at all or, if desired, limited heat is optionally transferred in a different way to the cap 20 at a controlled rate. In this embodiment, steam flows from supply line 49 through the vertical pipe 49*a* directly to the valve 202, i.e. without being allowed to enter the chamber inside cylinder 12 below cap 20. The space 46 inside the cylinder 12 below the cap 20 can be sealed at the lower end of the cylinder 12 as shown in FIGS. 19 and 20 or open at 51 and 53 (FIG. 23) to the interior of the crankcase at 31, if desired with the crosshead guide 20a held securely in place, e.g. by a brace at 55a and by pipe 49. Consequently, there is no significant direct heating of the cap; only incidental heating in the area of the steam inlet valves. However, to accomplish controlled heating when some heat is desired, limited heat can optionally be supplied to the top of cap 20 through a small steam pressurized supply passage 57 having an inlet 67 connected to steam supply pipe 49b and fed via distribution channel 59a within the cap to a few small dead ended radial chambers 161 connected to the cap or within the cap 20. The radial chambers 161 provide heat at a controlled rate to the top of the cap; the temperature gradient and maximum flux in Btu's/hr/ft$^2$ being significantly less than when the entire lower surface of the cap is steam jacketed by the steam chest 46 as shown in FIGS. 1-4. The size and number of the radial chambers 161 is chosen to provide a heat flux that maximizes the specific power output of the engine 10. The pressure-regulating valve 360 (not shown in FIG. 23), if used, is placed in this case between chamber 44 and pipe 49a.

Refer again to FIG. 24 which illustrates an alternate optional auxiliary clearance volume chamber at 352. Except for the removal of condensed steam, the auxiliary clearance volume 352 of FIG. 24 functions in the manner of the auxiliary clearance volume chamber 45 of FIG. 2 as described above and in application Ser. No. 12/075,042, now U.S. Pat. No. 7,997,080 by admitting steam through a throttling duct 350 of selected length and diameter. The auxiliary clearance volume chamber 352 is located in the cylinder cap 20 so that the throttling duct 350 communicates with the steam expansion chamber 44 at the top of the auxiliary clearance volume. The auxiliary clearance volume 352 like 45 (FIG. 2) reduces the pressure in steam chamber 44 at lower engine speeds as previously described. During operation when the throttle pressure is lowered, engine speed is, of course, reduced. Hence the auxiliary clearance chamber 45 or 352 can be used to automatically lower cylinder pressure to the reduced throttle pressure thereby eliminating the need for valve 360. In FIG. 2, gravity will drain condensate (if any) from chamber 45. Because of the high operating temperatures, no condensate should accumulate in chamber 352. However, if condensate does tend to form, a suitable thermostatic drain valve 356 can be used to remove the condensate through a drain 354 by opening when the engine is cold and closing when the engine is hot.

Characteristics and Unexpected Results

From the description of FIGS. 1 and 2 it can be seen that the invention is capable of providing even better protection against the chilling of the metal surfaces by low-pressure exhaust steam than a conventional steam-only uniflow engine. A uniflow steam engine exhausts steam adjacent to the piston head and there is no way to heat the surface of the uniflow piston head positioned adjacent to the ports through which steam is released. By contrast, in the present invention low-pressure steam is exhausted at the cap 20 comprising the steam cylinder head, exactly where heat can be supplied to the steam expansion chamber by the adjacent steam chest 46. Consequently, for certain applications, especially if start and stop operation and idling is essential, the present invention is able to provide better heat loss protection and therefore greater Rankine efficiency than that in a standard uniflow steam engine. The invention can provide better protection against power losses during operation in part through enhanced control of the steam mass admitted each stroke, e.g. by the provision of one or a pair of steam admission valves in the cap that open into the steam chest and in part through special exhaust valving which in one preferred form comprises a double aperture automatic exhaust valve having ports in both the piston skirt as well as in the cylinder wall which are covered when steam is admitted but which open adjacent the cylinder cap when aligned with one another while the steam chamber is in an expanded state. Additionally, the invention provides a combination I.C./steam engine in which residual steam within the piston can be recompressed so as to provide as effective zero clearance with a gain in mean Rankine cycle temperature. Moreover, low-pressure exhaust steam need not be ducted below the cylinder cap where it could cool the cap or the steam chest which is therefore able to jacket the entire lower surface of the steam cylinder cap in any installation in which it is advantageous to do so. In addition, the invention provides an oil ring on the piston for stripping combustion products and excess oil from the cylinder and depositing it in an annular collection channel that is built into the wall of the cylinder at a point located in alignment with the oil ring when at bottom dead center and a passage for carrying excess oil and blow-by combustion products to the sump. Optionally, the collection channel holds one or more wiper rings that press centrally against the outer wall of the piston for capturing excess oil and blow-by combustion products and ducting them to the engine sump before they can reach the steam exhaust manifold.

Besides sealing the steam expansion chamber 44, the stationary cylinder cap also provides support for one or a pair of steam inlet valves, reduces the steam clearance volume between its upper surface and the confronting inner wall of the piston, defines the top of the steam chest, can heat the steam exhaust area and supports packing around the piston rod to prevent the escape of steam. By providing a piston with a skirt that is in sealing and sliding relationship between both the steam cylinder head and the cylinder walls, the added length of the cylinder needed to accommodate steam is minimized since the steam chamber and I.C. chamber occupy the same space. In addition, the invention provides an improved system and sequence of heat transfer devices for efficiently recovering waste combustion heat from the I.C. engine assembly.

In summary, the invention provides the following benefits and unexpected results among others: 1) efficiency in a combined cycle engine as good or better than a uniflow steam engine while adding as little as possible length to the engine cylinders, 2) the steam expansion chamber occupies the same space as the combustion chamber of the I.C. engine, 3) the steam expansion chamber is heated by direct thermal transfer from the I.C. engine combustion chamber, 4) the burnt oil from the I.C. chamber as well as blow-by combustion gasses are kept separate from the steam expansion chamber and the exhausted steam, 5) the exhaust valve need not exhaust low-pressure steam below the steam cylinder head where it could cool incoming steam or interfere with steam jacketing of the steam cylinder head, 6) clearance volumes can be as small as desired since the opposing surfaces of the piston and cylinder cap are both flat, 7) the exhaust valve when opening sweeps adjacent steam and moisture if any out of the cylinder, then closes so that the cylinder pressure is brought up to or very close to the steam admission pressure thereby preventing steam at atmospheric pressure from washing heat from the cylinder walls and head, which if it occurred could reduce power due to the condensation of incoming steam, 8) piston walls are exposed to exhaust steam pressure only for the short period that the exhaust port is uncovered, whereupon the pressure and temperature immediately begin to rise so that at the end of the down stroke the temperature and pressure is such that an effective zero clearance is achieved with a gain in mean Rankine cycle temperature whereby efficiency is improved and the incoming steam meets relatively hot surfaces thereby preventing cooling of the incoming charge, 9) unlike a standard uniflow steam engine, the metal surface at the end of the steam chamber adjacent the exiting steam can be externally heated when it is advantageous to prevent exhaust steam at atmospheric pressure from chilling or condensing the incoming charge of steam, 10) a short steam admission cutoff can be provided without excessive valve and cam stress, 11) evaporative cooling improves steam production efficiency, 12) controlled heating or no heating of the cylinder cap reduces thermal loss in the exhausted steam, 13) steam recompression pressure can be limited to throttle pressure, 14) the engine can be mechanically connected to the wheels of a vehicle or used to charge a battery, and 15) momentum energy of a vehicle can be stored and used later.

Many variations of the present invention within the scope of the appended claims will be apparent to those skilled in the art once the principles described herein are understood.

What is claimed is:

1. A combined cycle engine comprising
at least one cylinder having a combustion piston slideably mounted therein between a combustion chamber and a steam expansion chamber wherein the combustion chamber is outward of the piston and the steam expansion chamber is located inside the piston between the piston and a fixed cylinder cap that is slideably and sealingly mounted inside the piston,
a steam supply heated by waste combustion heat is connected to power the engine by supplying steam to the steam expansion chamber through a pair of separate and independently movable inwardly retractable steam inlet valves located inside the piston and connected in communication with one another and with the steam expansion chamber through the cylinder cap,
a valve retractor connected to open each of the steam inlet valves proximally, and
a steam exhaust valve that opens to communicate with the steam expansion chamber for exhausting steam from the steam expansion chamber when the piston is in an expanded state and is closed during at least a portion of a power stroke thereof.

2. The combined cycle engine of claim 1 wherein the exhaust valve is an automatic valve comprising an exhaust opening in the piston skirt that enables steam to be exhausted through the piston when at the top center position and the exhaust opening is located in alignment with an exhaust port through the cylinder wall outward of the cylinder cap.

3. The combined cycle engine of claim 1 wherein the steam inlet valves comprise a pair of separate and independently movable inwardly retractable valves connected to communicate in series for opening when moved proximally and a phase control for regulating the overlap thereof.

4. The combined cycle engine of claim 3 wherein the steam inlet valves comprise a pair of inwardly retractable poppet valves that are concentric to one another wherein one of the valves has a central longitudinal bore and the other valve is slideably mounted therein and the phase control is a valve control connected to time the operation of at least one of the poppet valves.

5. A combination internal combustion steam engine comprising,
at least one cylinder with a piston that is operatively connected to a crankshaft and is mounted for reciprocation in the cylinder between an outer combustion chamber and inner steam expansion chamber enclosed within the piston,
a fixed cylinder cap sealingly and slideably mounted within the piston and having at least one inwardly opening steam admission valve therein which closes outwardly to cut off the flow of steam at a selected fraction of a power stroke of the engine,
a steam exhaust valve communicating with the steam expansion chamber,
a connecting rod that is centered substantially at the axis of a cylinder within a space located inwardly of the cylinder cap to provide the operative connection between the piston and the crankshaft, and
a combustion chamber cooling circuit that is integrated in series with a circuit connected to supply steam for powering the engine including an outlet duct connected to transfer heated combustion chamber coolant from a combustion chamber cooling jacket to absorb additional heat in an internal combustion exhaust fired steam generator having a steam outlet connected to supply steam to the steam expansion chamber through each such steam admission valve,
wherein said steam expansion chamber has an exhaust outlet connected to a steam condenser that has a condensate outlet connected to recycle a steam condensate back to the combustion chamber cooling jacket in a closed circuit.

6. The combination internal combustion steam engine of claim 5 wherein the cooling jacket has a steam outlet and a steam outlet duct is connected to the steam outlet of the cooling jacket for transferring steam produced by evaporative cooling within the cooling jacket of the engine to the steam generator for further heating the steam produced in the cooling jacket.

7. The combination internal combustion steam engine of claim 6
wherein at least one pipe carries liquid combustion chamber coolant to the cooling jacket and
wherein the combustion chamber coolant is sprayed from the at least one pipe into the cylinder to cool the cylinder.

8. The combination internal combustion steam engine of claim 5 wherein steam exhausted from the steam expansion chamber of the engine is connected in heat-exchange relationship with coolant passing from the cooling jacket to the steam generator to transfer heat from the exhausted steam to the coolant that is supplied from the cooling jacket to the steam generator.

9. The combination internal combustion steam engine of claim 5 wherein the condensate is transferred in heat-exchange relationship with steam exhausted from the engine before the condensate is transferred to the cooling jacket of the engine.

10. The combination internal combustion steam engine of claim 5 wherein said engine is mounted in a vehicle having wheels, the engine is connected to an electric generator to provide electric current to a member selected from a) a storage unit comprising a battery or a capacitor and b) an electric motor connected to drive the wheels of the vehicle.

11. The combination internal combustion steam engine of claim 5 wherein the engine is constructed and arranged with the piston slideably mounted over the cylinder cap to recompress residual steam after the steam exhaust valve has closed.

12. The combined cycle engine of claim 11 including an auxiliary clearance chamber within the engine that is connected to the steam expansion chamber.

13. The combination internal combustion engine of claim 5 having a steam exhaust valve in the cylinder sidewall for enabling steam to be exhausted through the cylinder sidewall when the steam expansion chamber is expanded and thereafter an inward movement of the piston recompresses residual steam therein.

14. The combination internal combustion engine of claim 5 wherein the at least one steam admission valve comprises a pair of separate and independently movable inwardly retractable valves communicating in series within the cylinder cap located within the piston and a control is connect to at least one steam admission valve for regulating the steam mass supplied to the steam chamber during outward strokes of the piston.

15. An engine having an operating cycle to provide energy transfer within at least one steam expansion chamber for imparting rotation to a crankshaft, said engine comprising,
a crankcase supporting at least one cylinder and having a crankshaft journaled for rotation therein,
a piston sealingly and slidably mounted in the cylinder,
a fixed cylinder head defining a steam expansion chamber in the cylinder between the cylinder head and the piston,
a connecting rod operatively associated between the piston and the crankshaft to rotate the crankshaft,
a pair of separate and independently movable concentric poppet valves connected in series communication with each other and through the cylinder head with the steam expansion chamber,
wherein the engine has a steam inlet passage communicating through the cylinder head,
wherein the concentric series connected poppet valves have two fixed concentric valve seats as a part of the steam inlet passage that are each positioned for being opened and closed by one of the concentric poppet valves and
wherein the poppet valves are concentric to one another with one poppet valve having a longitudinal bore and the other poppet valve being slidably mounted therein for injecting steam into the steam expansion chamber only when said concentric poppet valves are both in an open position off of said valve seats of said steam inlet passage.

16. The engine of claim 15 including a cam operatively connected to the crankshaft for actuating at least one of the concentric poppet valves.

17. The engine of claim 15 including a phase control for changing the phase of at least one of the concentric poppet valves to thereby regulate timing thereof.

18. The engine of claim 15 including at least a pair of movable actuator elements, each connected for opening or closing one of the concentric poppet valves at a selected time in a cycle of operation.

19. The combined cycle engine of claim 15 wherein at least one of said concentric poppet valves is a bump valve that is actuated by a bump force applied to a surface thereof by the piston.

20. A combined cycle engine comprising,
at least one cylinder having a combustion piston slideably and sealingly mounted therein between a combustion chamber and a steam expansion chamber,
the combustion chamber being outward of the piston and including a combustion intake valve and a combustion exhaust valve, the steam expansion chamber being located in the cylinder inward of the piston,
at least one steam inlet valve enclosed by the piston and connected to be operated in timed relationship to piston movement for admitting steam from a steam supply produced by waste combustion heat into the steam expansion chamber through a fixed cylinder cap that has a peripheral circular portion which is sealingly and slideably mounted within the piston,
said piston having a skirt that is slideable through an annular space between the cylinder and the cylinder cap,
a steam admission port located in the cylinder cap in communication with the steam inlet valve,
an exhaust valve having an exhaust port for discharging steam from the expansion chamber,
at least one rod operatively connected between the piston and a crankshaft and being disposed for movement in a space between the cylinder cap and the crankshaft,
wherein said steam inlet valve further comprises at least one valve element having a phase control associated therewith for timing the closing of the steam inlet valve as a fraction of a stroke of the piston and communicating with the steam expansion chamber through said steam admission port in the cylinder cap, and
the crankshaft is located inwardly of the piston on an opposite side of the cylinder cap from the expansion chamber.

21. The combined cycle engine of claim 20 wherein the at least one steam inlet valve comprises a pair of separate and independently moveable valves connected to communicate in series and being retractable sequentially for opening when both valves are moved proximally to admit steam into the steam expansion chamber through said admission port.

22. The combined cycle engine of claim 21 including variable valve timing of at least one of said two valves for changing the cutoff of steam to said steam expansion chamber as a fraction of a power stroke of said piston.

23. The combined cycle engine of claim 20 wherein the phase control is connected for varying the steam mass introduced into the steam expansion chamber during a steam power stroke of the piston.

24. The combined cycle engine of claim 20 wherein the engine is constructed and arranged for the piston to be slideably mounted over the cylinder cap to recompress residual steam remaining after steam is exhausted from the cylinder for providing pressurized steam in the steam expansion chamber.

25. The combined engine cycle of claim 24 including an auxiliary clearance volume communicating with the steam expansion chamber through a duct for controlling a flow of steam between the steam expansion chamber and the auxiliary clearance volume.

26. The combined cycle engine of claim 20 wherein the steam exhaust valve port opens through a sidewall of the cylinder at a location in the cylinder sidewall that is outward of the cylinder cap for exhausting steam when the piston is at a top center position.

27. The combined cycle engine of claim 20 wherein the steam supply is connected to transfer steam directly to the at least one steam inlet valve for maintaining steam from the steam supply substantially out of heat transfer relationship with parts of the cylinder cap other than the at least one inlet valve.

28. The combined cycle engine of claim 20 wherein controlled heating of the cylinder cap is provided by a heat-insulating substance located between the steam supply and the cylinder cap for reducing heat flux therethrough from the steam supply to the steam expansion chamber.

29. The combined cycle engine of claim 20 wherein at least one steam distribution channel extends from the steam supply to heat the cylinder cap.

30. The combined cycle engine of claim 20 including a combustion chamber cooling jacket that has a steam outlet and a steam outlet duct is connected to the steam outlet of the cooling jacket for transferring steam produced by evaporative cooling within the cooling jacket of the engine to the steam supply, said steam supply including a steam generator for heating the steam that was produced in the combustion chamber cooling jacket.

31. The combination internal combustion steam engine of claim 20 wherein a steam outlet of the steam generator is coupled to the cylinder cap so as to transfer heat flux to the cylinder cap for heating of the cylinder cap at a rate that is controlled to be less than that produced by jacketing the cylinder cap with the steam from the steam generator.

32. The combined cycle engine of claim 20 wherein a combustion chamber cooling circuit is in series with a steam supply circuit that is connected to power the engine,
    said series circuits comprising a single closed circuit including a passage connected to transfer combustion chamber coolant from a combustion chamber cooling jacket to an internal combustion exhaust powered steam generator that has a steam outlet connected to supply steam to the steam expansion chamber, and
    said expansion chamber having an exhaust outlet connected to a condenser that has a condensate outlet connected to recycle the coolant back to the cooling jacket.

33. The combined cycle engine of claim 20 wherein the engine has a cooling jacket with a steam outlet and a steam duct is connected to the steam outlet of the cooling jacket for transferring steam produced by evaporative cooling within the engine cooling jacket to a heater for heating steam from the cooling jacket with hot exhaust gasses from the combustion chamber.

34. The combined cycle engine of claim 33 wherein the cooling jacket includes at least one member selected from a) a sprayer connected for spraying the engine cylinder with a coolant liquid to thereby cause the liquid to flash into steam, and b) a source of vibration that is attached to the engine for imparting vibratory movement to the coolant contained in the combustion chamber cooling jacket.

35. The combined cycle engine of claim 20 wherein the engine is installed in a vehicle, the engine is connected to an electric generator to provide electric current to a member selected from an electrical storage unit and an electric motor connected to drive the wheels of the vehicle.

36. The combined cycle engine of claim 20 including an auxiliary clearance chamber in the engine that is connected to the steam expansion chamber.

37. The combined cycle engine of claim 20 having a steam exhaust valve in the cylinder sidewall for enabling steam to be exhausted through the cylinder sidewall when the steam expansion chamber is expanded and closes thereafter such that subsequent inward movement of the piston recompresses residual steam therein.

38. The combined cycle engine of claim 20 wherein the combined cycle engine is installed in a vehicle having wheels, a brake, and an energy storage unit, the energy storage unit is operatively connected to the wheels for transferring momentum energy from the wheels of the vehicle during a braking mode to the energy storage unit and
    wherein during a drive mode of the vehicle the energy stored in the energy storage unit is utilized for moving the vehicle.

39. The combined cycle engine of claim 38 wherein the energy storage unit is a storage battery or a capacitor and an electric generator is connected between the wheels and the energy storage unit at least during the braking mode.

40. The combined cycle engine of claim 20 including a control to establish the phase of the steam inlet valve utilizing one or more engine operating variables including a fuel consumption rate to time the cutoff of steam injected into the expansion chamber.

41. The combined cycle engine of claim 20 wherein an interior wall of the piston is covered by a sleeve formed from metal to provide a piston ring contact surface.

42. The combined cycle engine of claim 41 wherein the sleeve is spaced from a skirt of the piston in places.

43. The combined cycle engine of claim 20 wherein at least one of said valves is a bump valve that is actuated by a bump force applied to a surface thereof by the piston.

44. The combined cycle engine of claim 43 wherein said valve comprises said inlet valve and the bump force is applied to the inlet valve by a valve lifter that is attached to an inward surface of the piston.

45. The combined cycle engine of claim 20 wherein the steam supply includes an afterburner as a countercurrent steam superheater.

46. The combined cycle engine of claim 20 wherein the steam supply includes a superheater with a plurality of radial blades therein for guiding the flow of gas therethrough.

* * * * *

UNITED STATES PATENT AND TRADEMARK OFFICE
CERTIFICATE OF CORRECTION

PATENT NO.       : 8,109,097 B2
APPLICATION NO.  : 12/387113
DATED            : February 7, 2012
INVENTOR(S)      : James V. Harmon, Sr. et al.

It is certified that error appears in the above-identified patent and that said Letters Patent is hereby corrected as shown below:

IN THE CLAIMS:
Column 36, line 42 (Claim 7, last line), change "into" to -- onto --.

Signed and Sealed this
Twenty-seventh Day of March, 2012

David J. Kappos
*Director of the United States Patent and Trademark Office*